US011516260B2

(12) United States Patent
Duminuco et al.

(10) Patent No.: US 11,516,260 B2
(45) Date of Patent: Nov. 29, 2022

(54) SELECTIVE POLICY-DRIVEN INTERCEPTION OF ENCRYPTED NETWORK TRAFFIC UTILIZING A DOMAIN NAME SERVICE AND A SINGLE-SIGN ON SERVICE

(71) Applicant: Cisco Technology, Inc., San Jose, CA (US)

(72) Inventors: Alessandro Duminuco, Milan (IT); Hendrikus G. P. Bosch, Aalsmeer (NL); Jeffrey Michael Napper, Delft (NL); Vinny Parla, North Hampton, NH (US); Julien Barbot, Villebon-sur-Yvette (FR); Sape Jurrien Mullender, Amsterdam (NL)

(73) Assignee: Cisco Technology, Inc., San Jose, CA (US)

(*) Notice: Subject to any disclaimer, the term of this patent is extended or adjusted under 35 U.S.C. 154(b) by 113 days.

(21) Appl. No.: 17/166,921

(22) Filed: Feb. 3, 2021

(65) Prior Publication Data
US 2022/0247791 A1 Aug. 4, 2022

(51) Int. Cl.
G06F 17/00 (2019.01)
H04L 9/40 (2022.01)
(Continued)

(52) U.S. Cl.
CPC ........ H04L 63/205 (2013.01); H04L 61/4511 (2022.05); H04L 63/0281 (2013.01);
(Continued)

(58) Field of Classification Search
CPC ............... H04L 63/205; H04L 61/4511; H04L 63/0281; H04L 63/08; H04L 63/10;
(Continued)

(56) References Cited

U.S. PATENT DOCUMENTS

2014/0089661 A1* 3/2014 Mahadik ............... H04L 9/0643 713/162
2016/0373445 A1 12/2016 Hayton et al.
(Continued)

FOREIGN PATENT DOCUMENTS

EP 3716108 A1 * 9/2020 ............. G06F 21/53
EP 3716108 A1 9/2020

OTHER PUBLICATIONS

The International Preliminary Report on Patentability for PCT Application No. PCT/US22/14879, dated May 11, 2022. 21 Pages.

Primary Examiner — Cheikh T Ndiaye
(74) Attorney, Agent, or Firm — Lee & Hayes, P.C.

(57) ABSTRACT

Techniques for utilizing an enterprise traffic interception service (TIS) to enforce policies that mandate how clients access software as a service (SaaS) offered by service providers and selectively intercept enterprise network traffic utilizing a domain name service (DNS) and a single sign-on (SSO) service on a per-client per-service basis. The TIS may include a DNS server, an identity provider service, a TLS inspecting proxy, and/or a policy server. The DNS server may handle requests to resolve an address of a service, and identify a policy, stored in the policy server, to redirect the client based on the identity of the client and the service. The identity provider service may later query the policy server during client authorization for the service to verify that the client request is in line with the policy and allow or deny access to the service.

20 Claims, 10 Drawing Sheets

(51) Int. Cl.
 *H04L 67/141* (2022.01)
 *H04L 67/146* (2022.01)
 *H04L 61/4511* (2022.01)
 *H04L 67/01* (2022.01)

(52) U.S. Cl.
 CPC .............. *H04L 63/08* (2013.01); *H04L 63/10* (2013.01); *H04L 63/306* (2013.01); *H04L 67/01* (2022.05); *H04L 67/141* (2013.01); *H04L 67/146* (2013.01); *H04L 63/0815* (2013.01)

(58) Field of Classification Search
 CPC ..... H04L 63/306; H04L 67/01; H04L 67/141; H04L 67/146; H04L 63/0815
 See application file for complete search history.

(56) References Cited

U.S. PATENT DOCUMENTS

| | | |
|---|---|---|
| 2017/0346853 A1 | 11/2017 | Wyatt et al. |
| 2018/0270201 A1 | 9/2018 | Chanak et al. |
| 2018/0295134 A1 | 10/2018 | Gupta et al. |
| 2020/0186500 A1* | 6/2020 | Neystadt ................. H04L 67/02 |
| 2020/0213272 A1 | 7/2020 | Deverakonda Venkata et al. |
| 2020/0358827 A1* | 11/2020 | Foxhoven ........... H04L 61/4511 |

\* cited by examiner

SELECTIVE POLICY-DRIVEN INTERCEPTION OF ENCRYPTED NETWORK TRAFFIC UTILIZING A DOMAIN NAME SERVICE AND A SINGLE-SIGN ON SERVICE

TECHNICAL FIELD

The present disclosure relates generally to utilizing a domain name service (DNS) and a single sign-on (SSO) service for selective policy-driven interception of encrypted network traffic.

BACKGROUND

Today, enterprises are consuming software as a service (SaaS) from public service providers reachable through secure communication protocols that use SSO to authenticate clients. Such clients may be working from home or otherwise not located in the enterprise premises. If such a client is not in the enterprise premises, the client may access the SaaS directly and the enterprise has no insight to the data being exchanged between the client and the service provider. Such enterprises may utilize Hypertext Transfer Protocol Secure (HTTPS) proxies to intercept such data flows being exchanged between the client and the service provider, for auditing and security reasons. However, due to scalability and privacy concerns, an enterprise may only wish to selectively intercept such traffic, allowing, based on a per-user and per-service policy, certain flows to directly reach the SaaS without going through interception.

Traditional methods for enforcing such policy decisions may be implemented using a virtual private network (VPN), which attracts all traffic associated with remote clients in an enterprise-controlled network, where the enforcement can take place. However, such methods require a VPN client to be installed on client devices, which may be cumbersome for an enterprise to manage and intrusive for its clients.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
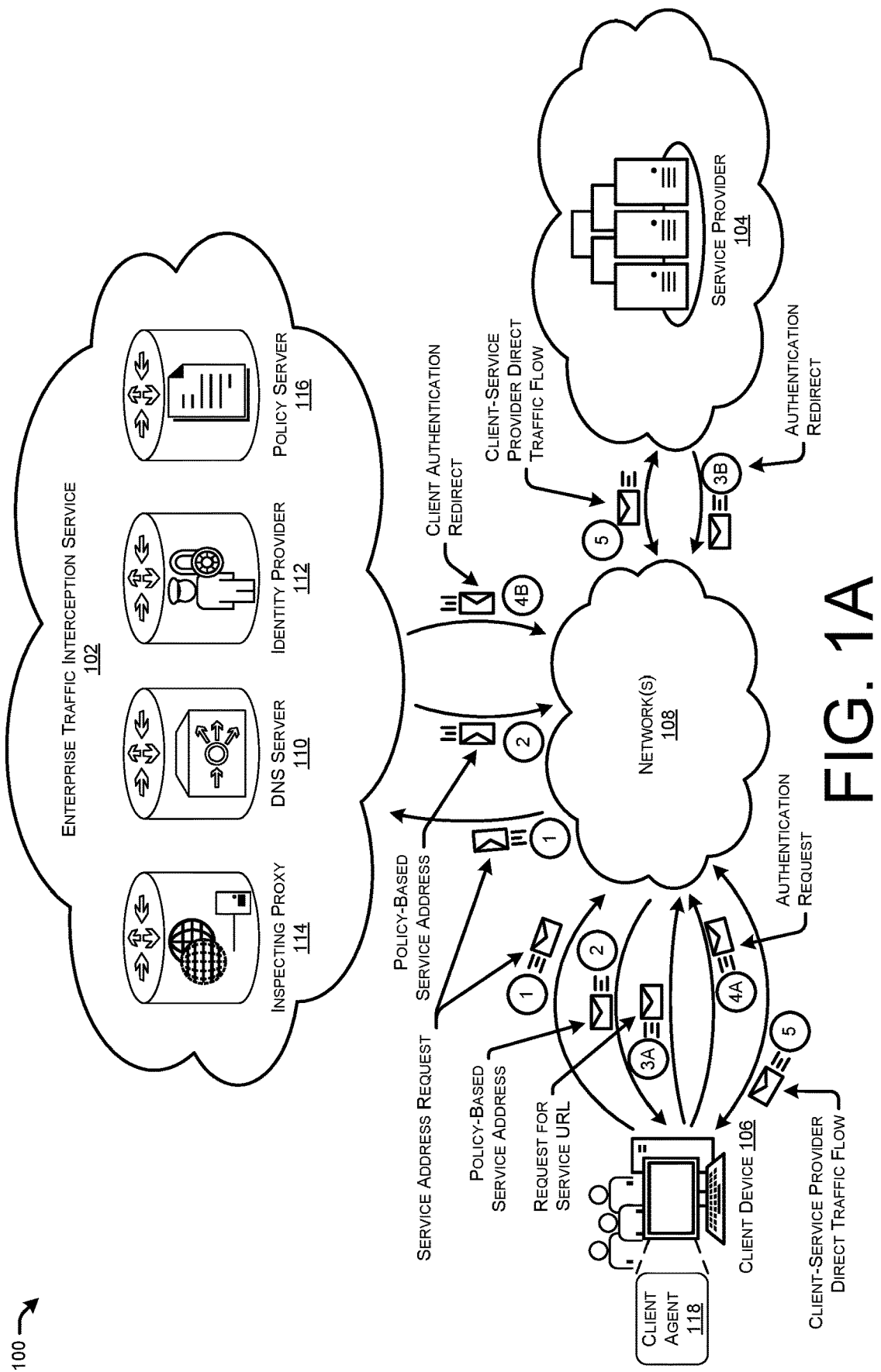
FIGS. 1A and 1B collectively illustrate a system-architecture diagram of an example environment for implementing at least some of the various technologies disclosed herein. The environment includes an enterprise traffic interception service that selectively intercepts enterprise network traffic utilizing a domain name service (DNS) and a single sign-on (SSO) service based on per-client per-service policies.

This disclosure describes a method of utilizing an enterprise traffic interception service to enforce policies allowing clients to access software as a service (SaaS) offered by service providers and selectively intercept enterprise network traffic utilizing a domain name service (DNS) and a single sign-on (SSO) service on a per-client per-service basis. The method includes receiving, at a DNS server associated with an enterprise network and from a user device, first data indicating an identity of a user associated with the user device. The method may further include receiving, at the DNS server and from the user device, a first request to resolve an address of a service associated with a service provider. The method may further include identifying, by the DNS server and based at least in part on the identity of the user, a policy associated with the user accessing the service. The policy may indicate that the user device is configured for a direct access path to the service. The method may further include providing, from the DNS server and to the user device, an indication of an address of the service associated with the service provider. The method may further include receiving, at the service provider and from the user device, a second request for the direct access path from the user device to the service provider. The method may further include receiving, at an identity provider of the enterprise network and from the user device, request data indicating a third request to authenticate the identity of the user to access the direct access path. The method may further include based at least in part on authenticating the identity of the user, receiving, at the identity provider, the policy. The method may further include determining, by the identity provider, that the policy indicates the direct access path and the request data indicates the direct access path. The method may further include based at least in part on determining that the policy indicates the direct access path and the request data indicates the direct access path, providing the user device with access to the direct access path from the user device to the service provider.

Additionally, or alternatively, the method includes receiving, at a DNS server associated with an enterprise network and from a user device, first data indicating an identity of a user associated with the user device. The method may further include receiving, at the DNS server and from the user device, a first request to resolve an address of a service associated with a service provider. The method may further include identifying, by the DNS server and based at least in part on the identity of the user, a policy associated with the user accessing the service. The policy may indicate that the user device is configured for a proxy access path to the service. The method may further include providing, from the DNS server and to the user device, an indication of an address of an inspecting proxy associated with the enterprise network. The method may further include receiving, at the inspecting proxy and from the user device, a second request for the proxy access path from the user device to the service provider via the inspecting proxy. The method may further include receiving, at an identity provider of the enterprise network and from the user device, request data indicating a third request to authenticate the identity of the user to access the proxy access path. The method may further include based at least in part on authenticating the identity of the user, receiving, at the identity provider, the policy. The method may further include determining, by the identity provider, that the policy indicates the proxy access path and the request data indicates the proxy access path. The method may further include based at least in part on determining that the policy indicates the proxy access path and the request data indicates the proxy access path, providing the user device with access to the proxy access path from the user device to the service provider via the inspecting proxy.

Additionally, or alternatively, the method includes receiving, at a DNS server associated with an enterprise network and from a user device, first data indicating an identity of a user associated with the user device. The method may further include receiving, at the DNS server and from the user device, a first request to resolve an address of a service associated with a service provider. The method may further include identifying, by the DNS server and based at least in part on the identity of the user, a policy associated with the user accessing the service. The policy may indicate that the user device is configured for a proxy access path to the service. The method may further include providing, from the DNS server and to the user device, an indication of an address of an inspecting proxy associated with the enterprise network. The method may further include receiving, at the service provider and from the user device, a second request for a direct access path from the user device to the service provider. The method may further include receiving, at an identity provider of the enterprise network and from the user device, request data indicating a third request to authenticate the identity of the user to access the direct access path. The method may further include based at least in part on authenticating the identity of the user, receiving, at the identity provider, the policy. The method may further include determining, by the identity provider, that the policy indicates the proxy access path and the request data indicates the direct access path. The method may further include based at least in part on determining that the policy indicates the proxy access path and the request data indicates the direct access path, denying the user device access to the direct access path from the user device to the service provider.

Additionally, or alternatively, the method includes receiving, at a DNS server associated with an enterprise network and from a user device, first data indicating an identity of a user associated with the user device. The method may further include receiving, at the DNS server and from the user device, a first request to resolve an address of a service associated with a service provider. The method may further include identifying, by the DNS server and based at least in part on the identity of the user, a policy associated with the user accessing the service. The policy may indicate that the user device is configured for a direct access path to the service. The method may further include providing, from the DNS server and to the user device, an indication of an address of the service associated with the service provider. The method may further include receiving, at an inspecting proxy associated with the enterprise and from the user device, a second request for the proxy access path from the user device to the service provider via the inspecting proxy. The method may further include receiving, at an identity provider of the enterprise network and from the user device, request data indicating a third request to authenticate the identity of the user to access the proxy access path. The method may further include based at least in part on authenticating the identity of the user, receiving, at the identity provider, the policy. The method may further include determining, by the identity provider, that the policy indicates the proxy access path and the request data indicates the direct access path. The method may further include based at least in part on determining that the policy indicates the proxy access path and the request data indicates the direct access path, denying the user device access to the direct access path from the user device to the service provider The techniques described in this disclosure may be performed as a method and/or by a system having non-transitory computer-readable media storing computer-executable instructions that, when executed by one or more processors, performs the techniques described above.

EXAMPLE EMBODIMENTS

As discussed above, enforcing policy decisions may be implemented using virtual private networks (VPNs), which attracts all traffic associated with the remote clients in an enterprise-controlled network, where the enforcement can take place. However, such methods require a VPN client to be installed on client devices, which may be cumbersome for an enterprise to manage and intrusive for its clients. As such, alternative methods for enterprises to enforce policy decisions have emerged. Such methods may be based on either a DNS server or an SSO server controlled by the enterprise.

For example, a client may authenticate themselves with the DNS server, such that, when the DNS server receives a resolution query from a client device attempting to access some service provider service, the DNS server can respond with an internet protocol (IP) address that corresponds to either the actual service provider service IP address or to the proxy IP address, according to the user policy. However, the DNS server has no way to guarantee that the client device does not disregard the DNS server decision. For example, the client device could cache old DNS server replies more than it should, ignore the DNS reply, or simply bypass the DNS server (e.g., with DNS over transport layer security (TLS) (DoT) or DNS over HTTPS (DoH)). In such a scenario, the client device could contact the IP address of the actual service provider service even if the policy mandates the client use the proxy. Additionally, some protocols will negotiate IP addresses over a private channel, thus never using a DNS server as a means to obtain the IP address information.

Additionally, a client may authenticate themselves with an SSO service that may be configured to, after authentication, redirect the client to the actual service provider service name (e.g., app.service.com) or to the proxy name (e.g. app.service.proxy.com), according to the user policy. However, there is no guarantee that the client device is correctly redirected during subsequent interactions with the service provider. For example, once the SSO service redirects a client device to the proxy name to access the service provider, there is no guarantee that the service does not redirect the client back to the actual name (app.service.com) either through an explicit redirect or by embedding references leading to the actual name in the content provided by the service. While this can be solved by content-rewriting at the proxy to ensure that no such redirections occur, such content-rewriting may be error-prone and, in some cases, not possible if certain standards are employed (e.g., WebAssembly). Additionally, malicious clients may attempt to intentionally bypass the proxy following authentication.

This disclosure describes techniques for an enterprise traffic interception service (TIS) that combines an enterprise-controlled DNS server and an SSO server to allow for selective transport layer security (TLS) policy-driven interception of encrypted network traffic associated with remote enterprise clients. The enterprise TIS may include a DNS server, an identity provider (IdP) service, a TLS inspecting proxy, and/or a policy server. In some examples, a DNS client agent may be installed on enterprise client devices, which may be configured to establish an authenticated channel with the enterprise TIS controlled DNS server. Additionally, or alternatively, access to a SaaS service provider via the enterprise client devices may be controlled using security assertion markup language (SAML) SSO provided by the IdP service. Additionally, or alternatively, the inspecting proxy may act as a man-in-the-middle (MitM) between the client agent (e.g., a browser executing on a client device) and the service provider. This may be achieved either by (1) installing a server certificate in the inspecting proxy or (2) installing an enterprise-issued root certificate authority in the enterprise client device. Additionally, or alternatively, the policy server may store one or more policies mandating client access to various service providers on a per-client per-service basis.

The enterprise TIS may provide various advantages to both the enterprise and enterprise clients. For example, by employing the enterprise TIS described herein, any and all policy violations, caused by a malicious client or the use of opaque DNS services, such as DoH and DoT, may be detected and prevented. Additionally, there is no need to install a VPN client on enterprise client devices, and instead may only require an authenticated DNS client agent, unless personalized DNS servers are employed by the enterprise. Further, there is no need for content rewriting at the inspecting proxy, as the inspecting proxy and the service provider may both respond to the same name (e.g., app.enterprise.com) based on the policy-driven direction by the DNS server. Moreover, there is no need to alter the method in which client agents and/or service providers handle SAML-based SSO authorizations, as will be described in more detail, allowing for an expedited onboarding process for enterprise users and contractors.

An enterprise may wish to selectively intercept TLS traffic between enterprise clients and publicly reachable SSO services offered by various service providers. In some examples, the enterprise may select which traffic to intercept on a per-client basis, a per-service basis, and/or a combination of the two. Enterprises may define per-client per-service policies driving such desired traffic interception. Such policies may be stored in a data store at an enterprise policy server associated with an enterprise TIS, such that the policies driving the traffic interception may be accessed and/or queried by various servers and/or components of the enterprise TIS on a per-client and/or per-service basis.

For example, a client belonging to an enterprise may wish to access a publicly reachable service consumed by the enterprise and offered by a service provider. The service may be accessible to client via a service name, such as, for example, "app.enterprise.com". As previously mentioned, the enterprise may wish to selectively intercept traffic between enterprise clients and service providers offering various services. As such, the enterprise may employ the services of the enterprise TIS described herein to implement selective traffic interception based on various enterprise defined per-client and per-service policies.

The enterprise may define various policies driving the selective traffic interception by the enterprise TIS. As previously described, policies may be defined on a per-client and/or per-service basis. For example, the enterprise may wish to intercept all traffic between a particular client and a service provider. Additionally, or alternatively, the enterprise may wish to intercept all traffic between any client belonging to the enterprise and a particular service provider. Additionally, or alternatively, the enterprise may wish to intercept traffic between a combination of a particular client and a particular service provider and/or a particular service offered by a service provider. The enterprise TIS may store such policies in a datastore of a policy server associated with the enterprise TIS.

Take for example, an environment including an enterprise TIS, an enterprise client operating an enterprise client device, and/or a service provider. As previously mentioned, the enterprise TIS may include a DNS server, an IdP service, an inspecting proxy, and/or a policy server. The DNS server may receive, from a client agent (e.g., a browser) executing on the enterprise client device, a request to resolve the service provider name (e.g., app.enterprise.com). The enterprise DNS server may determine an identity of the client. For example, the client device may have an authenticated DNS client agent installed thereon. The authenticated DNS client agent may be configured to establish an authenticated channel with the enterprise TIS controlled DNS server, providing the enterprise DNS server with an authenticated identity of the client. Additionally, or alternatively, the enterprise DNS server may be configured such that all requests to resolve a service provider name must include a client ID that may be used to identify the client.

Once the enterprise DNS server has identified the client, the DNS server may query the policy server based on the client name and the service name. The DNS server may determine, based on an associated policy, that the client needs to access the service direct, and as such, the DNS server replies to the client agent with the IP address of the actual service provider (e.g., 5.6.7.8). Additionally, or alternatively, the DNS server may determine, based on the associated policy, that the client needs to go through the inspecting proxy to access the service, and as such, the DNS server replies to the client agent with the IP address of the inspecting proxy (e.g., 1.2.3.4).

In such examples where the DNS server replies to the client agent with the IP address of the service provider (e.g., 5.6.7.8), such as, for example, when the policy mandates that the client access the service provider directly, the client agent may then utilize the IP address to directly contact the service provider and request for a specific URL or path (e.g., app.enterprise.com/path). The service provider may then redirect the user agent to the enterprise IdP service along with a service provider SAML request, generated by the service provider. The enterprise IdP service may then work to authenticate the client. In some examples, the enterprise IdP service may challenge the client using any authentication technique, such as, for example single-factor authentication, multi-factor authentication, biometric authentication, etc.

In such examples where the DNS server replies to the client agent with the IP address of the inspecting proxy (e.g. 1.2.3.4), such as, for example, when the policy mandates that the client access the service provider via an inspecting proxy, the client agent may then utilize the IP address to contact the inspecting proxy and with a request for a specific URL or path associated with the service provider (e.g., app.enterprise.com/path). The inspecting proxy may then redirect the user agent to the enterprise IdP service along with a proxy SAML request, generated by the inspecting proxy. In some examples, the proxy SAML request may be specific to the inspecting proxy and/or different than the service provider SAML request that the service provider may generate. For example, the proxy SAML request may include a signature of the inspecting proxy (e.g., request digest encrypted with proxy private key). The enterprise IdP service may then work to authenticate the client. In some examples, the enterprise IdP service may challenge the client using any authentication technique, such as, for example single-factor authentication, multi-factor authentication, biometric authentication, etc.

Once enterprise IdP service has authenticated and/or identified the client, the enterprise IdP service may query the policy server based on the client name and the service name. The enterprise IdP service may determine, based on the associated policy, that the client needs to access the service direct. Additionally, or alternatively, the enterprise IdP service may determine, based on the associated policy, that the client needs to go through the inspecting proxy to access the service. The enterprise IdP service may then perform a policy verification to verify that the client is being compliant with the policy, such as, for example, verifying that the SAML request received from the client agent comports with the policy.

In such examples where the policy mandates that the client access the service provider directly, the enterprise IdP may perform a policy verification to verify that the client is being compliant with the policy. In some examples, the enterprise IdP service may verify that the SAML request previously received has been issued by the service provider, which may indicate that the user agent is attempting to connect directly to the service provider. The enterprise IdP service may determine that this is in line with the policy disposition received from the policy server, and the enterprise IdP service may authorize the flow and generate a SAML assertion to send to the client device. In some examples the SAML assertion may be configured as a service provider SAML assertion to assert authorization for the service provider. Additionally, or alternatively, the enterprise IdP service may determine that the SAML request previously received has been issued by the inspecting proxy, which may indicate that the user agent is attempting to go through the inspecting proxy to connect to the service provider. The enterprise IdP service may determine that this is not in line with the policy disposition received from the policy server, and the enterprise IdP may deny the flow and/or notify the client of access denial due to violation of the policy.

In such examples, where the policy mandates that the client access the service provider via an inspecting proxy, the enterprise IdP may perform the policy verification to verify that the client is being compliant with the policy. In some examples, the enterprise IdP may verify that the SAML request previously received has been issued by the inspecting proxy, which may indicate that the user agent is attempting to go through the inspecting proxy to connect to the service provider. The enterprise IdP service may determine that this is in line with the policy disposition received from the policy server, and the enterprise IdP service may authorize the flow and generate two SAML assertions, such as, for example, a proxy SAML assertion in response to the proxy SAML request, and a service provider SAML assertion to assert authorization for the service provider. In some examples, the proxy SAML assertion is sent to the client device and the service provider SAML assertion is stored in a data store associated with the enterprise IdP service. Additionally, or alternatively, the enterprise IdP service may determine that the SAML request previously received has been issued by the service provider, which may indicate that the user agent is attempting to connect directly to the service provider. The enterprise IdP service may determine that this is not in line with the policy disposition received from the policy server, and the enterprise IdP may deny the flow and/or notify the client of access denial due to violation of the policy.

In such examples where the enterprise IdP service sends the service provider SAML assertion to the client agent, the enterprise IdP may redirect the client agent to the service name (e.g., app.enterprise.com with IP address 5.6.7.8) along with the service provider SAML assertion. The service provider may use the service provider SAML assertion to authorize the client and may serve the request content to the client device. Additionally, or alternatively, the service provider may install a cookie to maintain the authorization for a subsequent period of time. The service provider may then send the cookie to the client device, where the cookie may be utilized to authorize the client device with the service provider for the subsequent period of time.

In such examples where the enterprise IdP service sends the proxy SAML assertion to the client agent, the enterprise IdP service may redirect the client agent to the service name (e.g., app.enterprise.com with IP address 1.2.3.4) along with the proxy SAML assertion. The inspecting proxy may then query the enterprise IdP service, providing the enterprise IdP service with the proxy SAML assertion, to receive the service provider SAML assertion stored in the data store associated with the enterprise IdP service. The inspecting proxy may then send the request to the service provider and provide the service provider with the service provider SAML statement retrieved from the enterprise IdP service. The service provider may then use the service provider SAML assertion to authorize the client and serve the requested content to the inspecting proxy, where the inspecting proxy may forward the content to the client agent. Additionally, or alternatively, the service provider may install a first cookie to maintain the authorization for a subsequent period of time. The service provider may then send the first cookie to the inspecting proxy, where the cookie may be utilized to authorize the client via the inspecting proxy with the service provider for the subsequent period of time. Additionally, or alternatively, the inspecting proxy may store the first cookie in a local data store associated with the inspecting proxy. The inspecting proxy may then install a second cookie to maintain the authorization to the proxy for a subsequent period of time. The inspecting proxy may then send the second cookie to the client device, where the second cookie may be utilized to authorize the client device with the inspecting proxy for the subsequent period of time. This prevents the client device from using the first cookie to access the service provider directly, which is not in line with the policy.

Additionally, or alternatively, the processes described herein may be performed without the authenticated DNS agent on the enterprise client devices. As previously described, the authenticated DNS client may be configured to establish an authenticated channel with the enterprise TIS controlled DNS server, providing the enterprise DNS server with an authenticated identity of the client. However, the DNS server may determine an identity of the client in other ways. In some examples, a personalized DNS server may be implemented. For example, a different DNS server may be utilized for each client, or groups of clients under the same policy. Each DNS server may respond to the query according to the client (or group of clients) policy that it is associated with. Thus, relieving the system and/or process of the requirement to have an authenticated DNS client, and instead the system and/or process may only require a client to configure their own device to use a specific (personalized) DNS server, such as, for example, an IPv6 DNS server and an IPv6 subnet configured to carry the user identity in the ending 64 bits.

Although the techniques described as being implemented utilizing an enterprise traffic interception service, including computing servers, data centers, and/or a cloud computing network, the techniques are generally applicable for any network of devices managed by an entity where virtual resources may be provisioned. In some instances, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to selective transport layer security (TLS) policy-driven interception of encrypted network traffic associated with remote enterprise clients. For example, the techniques described herein may allow for detection and prevention of any and all enterprise defined policy violations, caused by a malicious client or the use of opaque DNS services, such as DoH and DoT. Additionally, there is no need to install a VPN client on enterprise client devices, and instead may only require an authenticated DNS client agent, unless personalized DNS servers are employed by the enterprise. Further, there is no need for content rewriting at the inspecting proxy, as the inspecting proxy and the service provider may both respond to the same name (e.g., app.enterprise.com) based on the policy-driven direction by the DNS server Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1B:
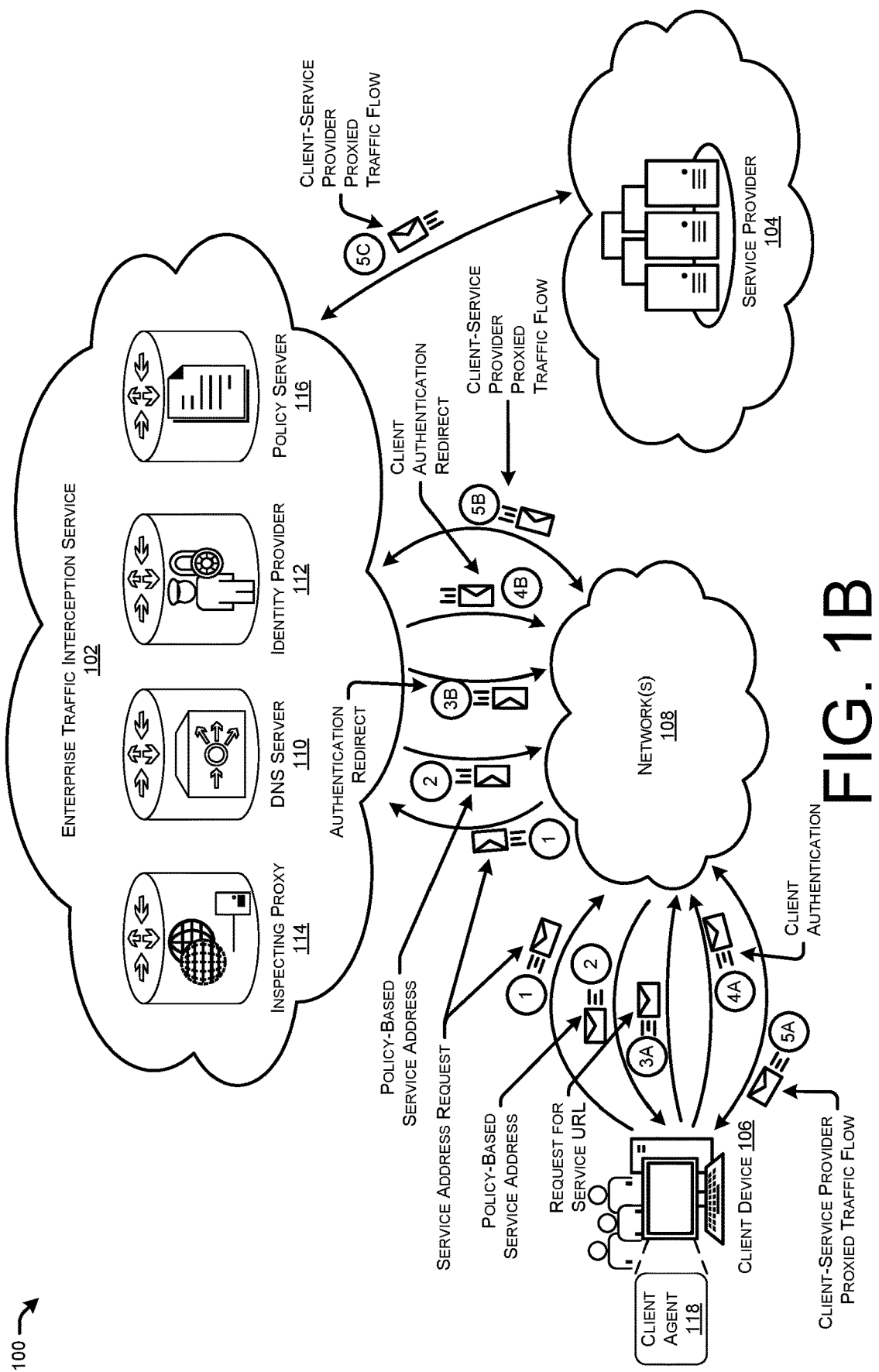

FIGS. 1A and 1B collectively illustrate a system-architecture diagram of an example environment 100 for implementing at least some of the various technologies disclosed herein. The environment 100 includes an enterprise traffic interception service (TIS) 102 that selectively intercepts enterprise network traffic, such as communications between various service providers, such as service provider 104, and one or more enterprise client devices, such as client device 106, via one or more network(s) 108, utilizing a domain name service (DNS) and a single sign-on (SSO) service based on per-client per-service policies. Additionally, FIG. 1A illustrates an example policy-based direct traffic flow associated with the enterprise TIS 102 between the service provider 104 and the client device 106, while FIG. 1B illustrates an example policy-based proxied traffic flow associated with the enterprise TIS 102 between the service provider 104 and the client device 106.

The enterprise TIS 102 may include one or more components and/or configurations. For example, the enterprise TIS 102 may include a DNS server 110, an IdP service 112, a TLS inspecting proxy 114, and/or a policy server 116. The DNS server 110 may be configured to establish an authenticated channel with a DNS client agent 118 hosted on a client device 106. Access to a service offered by a service provider 104 via the client device(s) 106 may be controlled using SAML-based SSO provided by the enterprise IdP service 112. The inspecting proxy 114 may act as a man-in-the-middle (MitM) between the client agent 118 (e.g., a browser executing on a client device) and the service provider 104. This may be achieved either by (1) installing a server certificate in the inspecting proxy 114 or (2) installing an enterprise-issued root certificate authority in the enterprise client device 106. Additionally, or alternatively, the policy server 116 may store one or more policies mandating client access to various service providers 104 on a per-client per-service basis.

The client device 106 may comprise any type of device configured to communicate using various communication protocols (e.g., VPN, SSL, TLS, DTLS, and/or any other protocol) over the networks 108. For instance, the client device 104 may comprise a personal client device (e.g., desktop computers, laptop computers, phones, tablets, wearable devices, entertainment devices such as televisions, etc.), network devices (e.g., servers, routers, switches, access points, etc.), and/or any other type of computing device. The client device 106 may host a client agent 118. The client agent 118 may comprise a VPN client, TLS client, web browser, or another application configured to enable communications over the networks 108. In some examples, the client agent 118 may be configured to establish an authenticated channel with the enterprise TIS 102 controlled DNS server 110.

The example service provider 104 may provide one or more services to various client devices via the networks 108. The service provider 104 may include, in some examples, an application service, a website, or another cloud-based service. In some examples, the service provider 104 may provide basic resources such as processor (CPU), memory (RAM), storage (disk), and networking (bandwidth) to the client device 106. Additionally, in some examples, the service provider 104 may provide, host, or otherwise support one or more application services for the client devices 106 to connect to and use. In some instances, computing resources associated with and/or allocated to the service provider 104 may be stored in various data centers located at different physical locations. For instance, first computing resources of the service provider 104 may be stored in a first data center located in a first geographic location while second computing resources of the service provider 104 may be stored in a second data center located in a second geographic location. The data centers may be physical facilities or buildings located across geographic areas that are designated to store networked devices. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs.

The enterprise TIS 102, including the enterprise DNS server 110, enterprise IdP service 112, enterprise inspecting proxy 114, and enterprise policy server 116, as well as the client device 106, client agent 118, and/or service provider 104 may communicate via one or more networks 108, such as the internet. The networks 108 may include one or more networks implemented by any viable communication technology, such as wired and/or wireless modalities and/or technologies. The networks 108 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

An enterprise may wish to selectively intercept TLS traffic between enterprise clients 106 and publicly reachable SSO services offered by various service providers 104. In some examples, the enterprise may select which traffic to intercept on a per-client basis, a per-service basis, and/or a combination of the two. Enterprises may define per-client per-service policies driving such desired traffic interception. Such policies may be stored in a data store at an enterprise policy server 116 associated with an enterprise TIS 102, such that the policies driving the traffic interception may be accessed and/or queried by various servers and/or components of the enterprise TIS 102 on a per-client and/or per-service basis.

For example, a client 106 belonging to an enterprise may wish to access a publicly reachable service consumed by the enterprise and offered by a service provider 104. The service may be accessible to client 106 via a service name, such as, for example, "app.enterprise.com". As previously mentioned, the enterprise may wish to selectively intercept traffic between enterprise clients 106 and service providers 104 offering various services. As such, the enterprise may employ the services of the enterprise TIS 102 described herein to implement selective traffic interception based on various enterprise defined per-client and per-service policies.

The enterprise may define various policies driving the selective traffic interception by the enterprise TIS 102. As previously described, policies may be defined on a per-client and/or per-service basis. For example, the enterprise may wish to intercept all traffic between a particular client device 106 and a service provider 104. Additionally, or alternatively, the enterprise may wish to intercept all traffic between any client device 106 belonging to the enterprise and a particular service provider 104. Additionally, or alternatively, the enterprise may wish to intercept traffic between a combination of a particular client 106 and a particular service provider 104 and/or a particular service offered by a service provider 104. The enterprise TIS 102 may store such policies in a datastore of a policy server 116 associated with the enterprise TIS 102.

As noted above, FIG. 1A illustrates an example traffic flow associated with the enterprise TIS 102 enforcing a policy allowing a client device 106 access to a service provider 104 using a direct connection.

At "1," the DNS server 110 may receive, from a client agent 118 (e.g., a browser) executing on the enterprise client device 106, a request to resolve the service provider 104 name (e.g., app.enterprise.com). The enterprise DNS server 110 may determine an identity of the client. For example, the client device 106 may have an authenticated DNS client agent 118 installed thereon. The authenticated DNS client agent 118 may be configured to establish an authenticated channel with the enterprise TIS controlled DNS server 110, providing the enterprise DNS server 110 with an authenticated identity of the client. Additionally, or alternatively, the enterprise DNS server 110 may be configured such that all requests to resolve a service provider 104 name must include a client ID that may be used to identify the client.

At "2," once the enterprise DNS server 110 has identified the client, the DNS server 110 may query the policy server 116 based on the client name and the service name. The DNS server 110 may determine, based on an associated policy, that the client needs to access the service direct, and as such, the DNS server 110 replies to the client agent 118 with the IP address of the actual service provider 104 (e.g., 5.6.7.8).

At "3A," the client agent 118 may then utilize the IP address to directly contact the service provider 104 and request for a specific URL or path (e.g., app.enterprise.com/path).

At "3B," the service provider 104 may receive the request for the specific URL and then redirect the client agent to the enterprise IdP service 112 along with a service provider SAML request, generated by the service provider 104, for authentication.

At "4A," the enterprise IdP service 112 may then work to authenticate the client. In some examples, the enterprise IdP service 112 may challenge the client using any authentication technique, such as, for example single-factor authentication, multi-factor authentication, biometric authentication, etc. Once enterprise IdP service 112 has authenticated and/or identified the client, the enterprise IdP service 112 may query the policy server 116 based on the client name and the service name. The enterprise IdP service 112 may determine, based on the associated policy, that the client device 106 needs to access the service direct.

The enterprise IdP service 112 may then perform a policy verification to verify that the client is being compliant with the policy, such as, for example, verifying that the SAML request received from the client agent 118 comports with the policy. The enterprise IdP service 112 may verify that the SAML request previously received has been issued by the service provider 104, which may indicate that the user agent 118 is attempting to connect directly to the service provider 104. The enterprise IdP service 112 may determine that this is in line with the policy disposition received from the policy server 116, and the enterprise IdP service 112 may authorize the flow and generate a SAML assertion to send to the client device 106. In some examples the SAML assertion may be configured as a service provider 104 SAML assertion to assert authorization for the service provider 104.

Additionally, or alternatively, the enterprise IdP service 112 may determine that the SAML request previously received has been issued by the inspecting proxy 114, which may indicate that the user agent 118 is attempting to go through the inspecting proxy 114 to connect to the service provider 104. The enterprise IdP service 112 may determine that this is not in line with the policy disposition received from the policy server 116, and the enterprise IdP 112 may deny the flow and/or notify the client of access denial due to violation of the policy.

At "4B," the enterprise IdP service 112 may redirect the client agent 118 to the service name (e.g., app.enterprise.com with IP address 5.6.7.8) along with the service provider SAML assertion.

At "5," the service provider 104 may use the service provider SAML assertion to authorize the client and may serve the request content to the client device 106. Additionally, or alternatively, the service provider 104 may install a cookie to maintain the authorization for a subsequent period of time. The service provider 104 may then send the cookie to the client device 106, where the cookie may be utilized to authorize the client device 106 with the service provider 104 for the subsequent period of time.

Additionally, or alternatively, the example traffic flow described herein may be performed without the authenticated DNS client agent 118 on the enterprise client device 106. As previously described, the authenticated DNS client agent 118 may be configured to establish an authenticated channel with the enterprise TIS 102 controlled DNS server 110, providing the enterprise DNS server 110 with an authenticated identity of the client. However, the DNS server 110 may determine an identity of the client in other ways. In some examples, a personalized DNS server may be implemented. For example, a different DNS server may be utilized for each client, or groups of clients under the same policy. Each DNS server may respond to the query according to the client (or group of clients) policy that it is associated with. Thus, relieving the system and/or process of the requirement to have an authenticated DNS client agent 118, and instead the system and/or process may only require a client to configure their own device to use a specific (personalized) DNS server.

With respect to FIG. 1B, further illustrated is an example traffic flow associated with the enterprise TIS 102 enforcing a policy allowing a client device 106 access to a service provider 104 using a proxied connection.

At "1," the DNS server 110 may receive, from a client agent 118 (e.g., a browser) executing on the enterprise client device 106, a request to resolve the service provider 104 name (e.g., app.enterprise.com). The enterprise DNS server 110 may determine an identity of the client. For example, the client device 106 may have an authenticated DNS client agent 118 installed thereon. The authenticated DNS client agent 118 may be configured to establish an authenticated channel with the enterprise TIS controlled DNS server 110, providing the enterprise DNS server 110 with an authenticated identity of the client. Additionally, or alternatively, the enterprise DNS server 110 may be configured such that all requests to resolve a service provider 104 name must include a client ID that may be used to identify the client.

At "2," once the enterprise DNS server 110 has identified the client, the DNS server 110 may query the policy server 116 based on the client name and the service name. the DNS server 110 may determine, based on an associated policy, that the client needs to go through the inspecting proxy 114 to access the service, and as such, the DNS server 110 replies to the client agent 118 with the IP address of the inspecting proxy (e.g., 1.2.3.4).

At "3A," the client agent 118 may then utilize the IP address to contact the inspecting proxy 114 with a request for a specific URL or path associated with the service provider (e.g., app.enterprise.com/path).

At "3B," The inspecting proxy 114 may then redirect the client agent 118 to the enterprise IdP service 112 along with a proxy SAML request, generated by the inspecting proxy 114. In some examples, the proxy SAML request may be specific to the inspecting proxy 114 and/or different than the service provider SAML request that a service provider 104 may generate. For example, the proxy SAML request may include a signature of the inspecting proxy 114 (e.g., request digest encrypted with proxy private key).

At "4A," the enterprise IdP service 112 may then work to authenticate the client. In some examples, the enterprise IdP service 112 may challenge the client using any authentication technique, such as, for example single-factor authentication, multi-factor authentication, biometric authentication, etc. Once enterprise IdP service has authenticated and/or identified the client, the enterprise IdP service may query the policy server based on the client name and the service name. The enterprise IdP service may determine, based on the associated policy, that the client needs to go through the inspecting proxy to access the service.

The enterprise IdP service 112 may then perform a policy verification to verify that the client is being compliant with the policy, such as, for example, verifying that the SAML request received from the client agent 118 comports with the policy. The enterprise IdP service 112 may verify that the SAML request previously received has been issued by the inspecting proxy 114, which may indicate that the client agent 118 is attempting to go through the inspecting proxy 114 to connect to the service provider 104. The enterprise IdP service 102 may determine that this is in line with the policy disposition received from the policy server 116, and the enterprise IdP service 102 may authorize the flow and generate two SAML assertions, such as, for example, a proxy SAML assertion in response to the proxy SAML request, and a service provider SAML assertion to assert authorization for the service provider 104. In some examples, the proxy SAML assertion is sent to the client device 106 and the service provider SAML assertion is stored in a data store associated with the enterprise IdP service 112.

Additionally, or alternatively, the enterprise IdP service 112 may determine that the SAML request previously received has been issued by the service provider 104, which may indicate that the user agent 118 is attempting to connect directly to the service provider 104. The enterprise IdP service 112 may determine that this is not in line with the policy disposition received from the policy server 116, and the enterprise IdP service 112 may deny the flow and/or notify the client of access denial due to violation of the policy.

At "4B," the enterprise IdP service 112 may redirect the client agent 118 to the service name (e.g., app.enterprise.com with IP address 1.2.3.4) along with the proxy SAML assertion.

At "5," the client agent 118 may be redirected to the inspecting proxy 114, and the inspecting proxy 114 may then query the enterprise IdP service 112, providing the enterprise IdP service 112 with the proxy SAML assertion, to receive the service provider SAML assertion stored in the data store associated with the enterprise IdP service 112. It should be understood that "5" may encapsulate "5A," "5B," and "5C." The inspecting proxy 114 may then send the request to the service provider 104 and provide the service provider 104 with the service provider SAML statement retrieved from the enterprise IdP service 112. The service provider 104 may then use the service provider SAML assertion to authorize the client and serve the requested content to the inspecting proxy 114 (see "5C"), where the inspecting proxy 114 may forward the content to the client agent (see "5B" and "5A"). Additionally, or alternatively, the service provider 104 may install a first cookie to maintain the authorization for a subsequent period of time. The service provider 104 may then send the first cookie to the inspecting proxy 114, where the cookie may be utilized to authorize the client via the inspecting proxy 114 with the service provider 104 for the subsequent period of time. Additionally, or alternatively, the inspecting proxy 114 may store the first cookie in a local data store associated with the inspecting proxy 114. The inspecting proxy 114 may then install a second cookie to maintain the authorization to the proxy 114 for a subsequent period of time. The inspecting proxy 114 may then send the second cookie to the client device 106, where the second cookie may be utilized to authorize the client device 106 with the inspecting proxy 114 for the subsequent period of time. This prevents the client device 106 from using the first cookie to access the service provider 104 directly, which is not in line with the policy.

Additionally, or alternatively, the example traffic flow described herein may be performed without the authenticated DNS client agent 118 on the enterprise client device 106. As previously described, the authenticated DNS client agent 118 may be configured to establish an authenticated channel with the enterprise TIS 102 controlled DNS server 110, providing the enterprise DNS server 110 with an authenticated identity of the client. However, the DNS server 110 may determine an identity of the client in other ways. In some examples, a personalized DNS server may be implemented. For example, a different DNS server may be utilized for each client, or groups of clients under the same policy. Each DNS server may respond to the query according to the client (or group of clients) policy that it is associated with. Thus, relieving the system and/or process of the requirement to have an authenticated DNS client agent 118, and instead the system and/or process may only require a client to configure their own device to use a specific (personalized) DNS server.

Figure 2A:
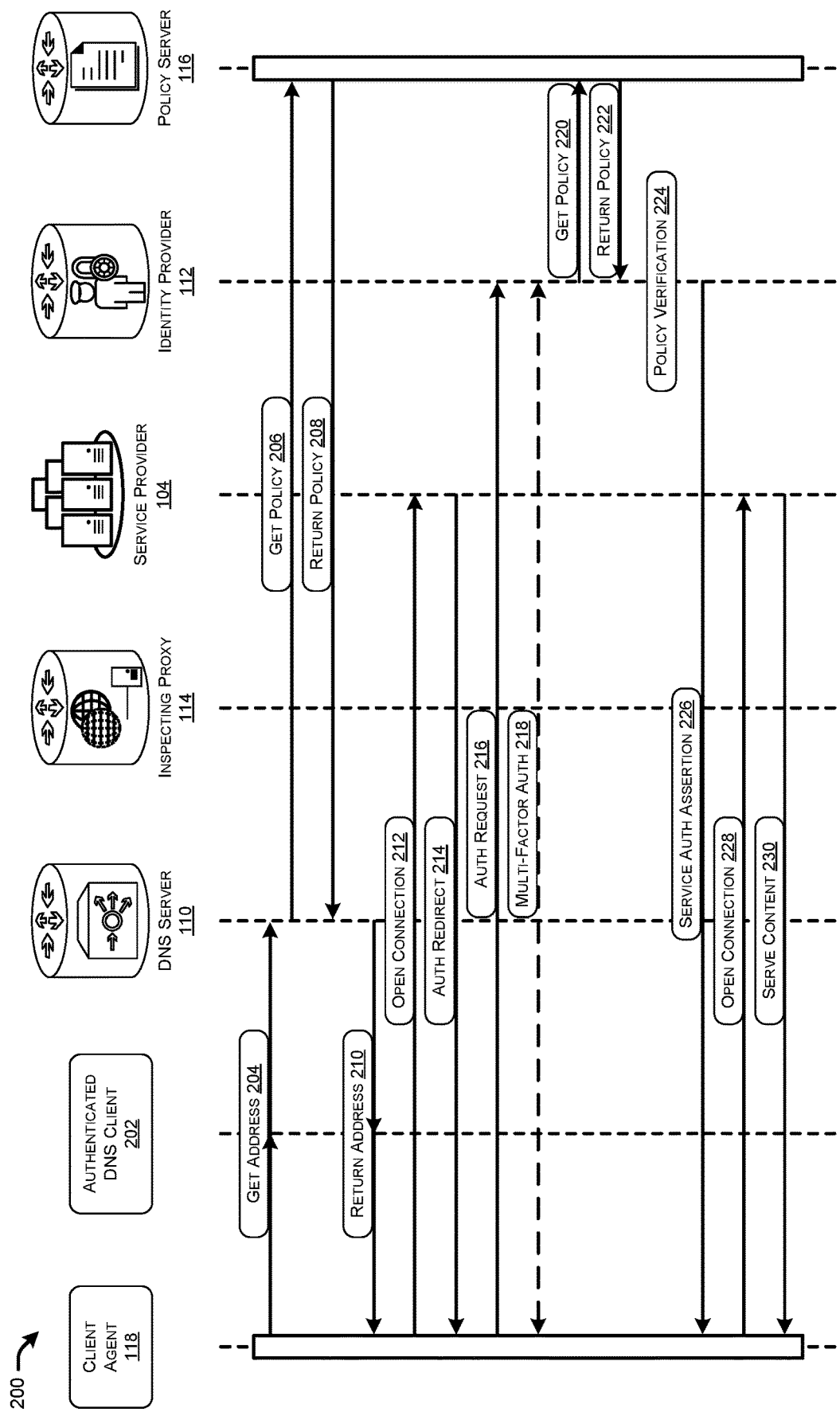
FIG. 2A illustrates a data flow diagram of an example process according to which an enterprise traffic interception service may enforce a policy allowing a client device access to a service provider using a direct connection.
Figure 2B:
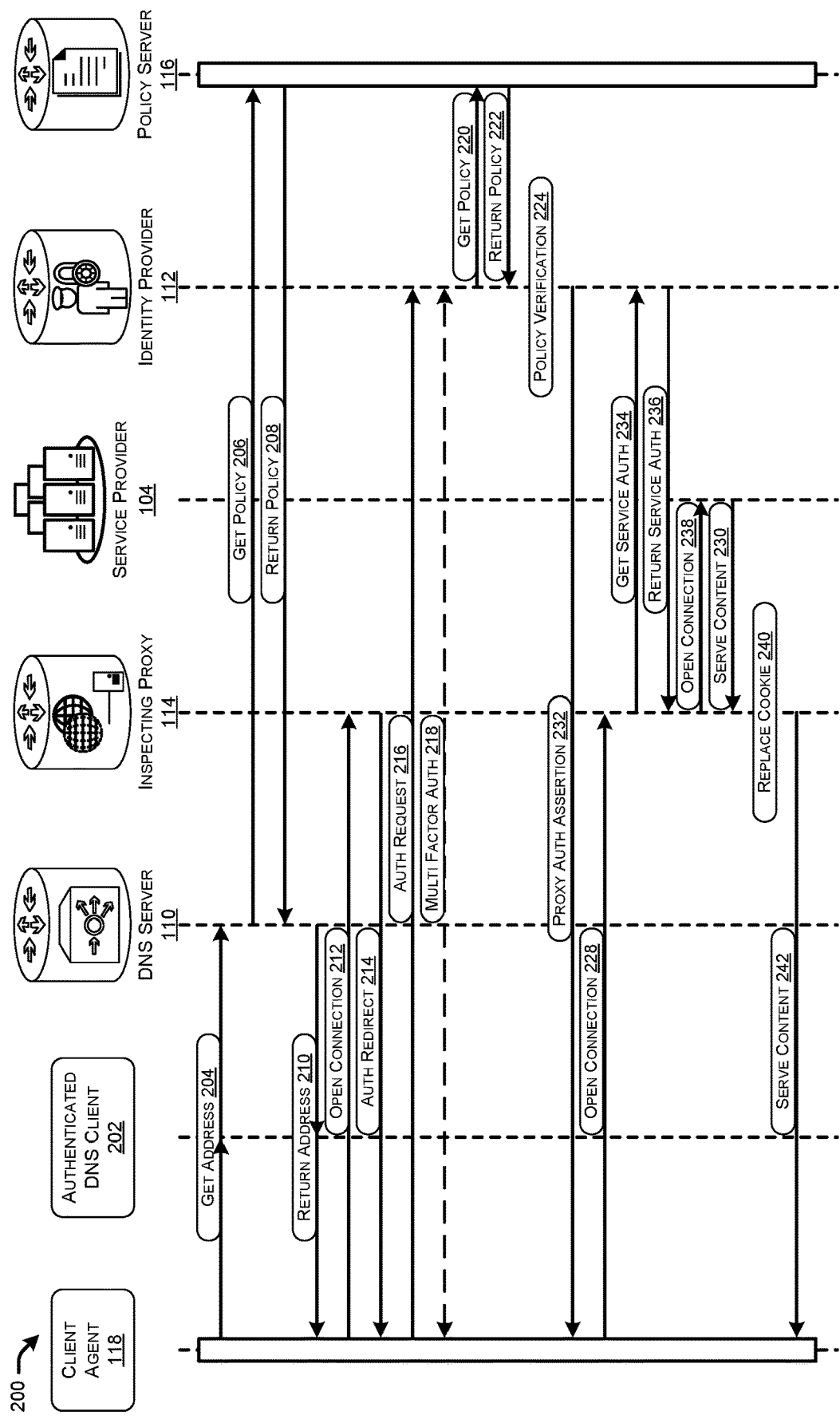
FIG. 2B illustrates a data flow diagram of an example process according to which an enterprise traffic interception service may enforce a policy allowing a client device access to a service provider using a proxied connection.
Figure 2C:
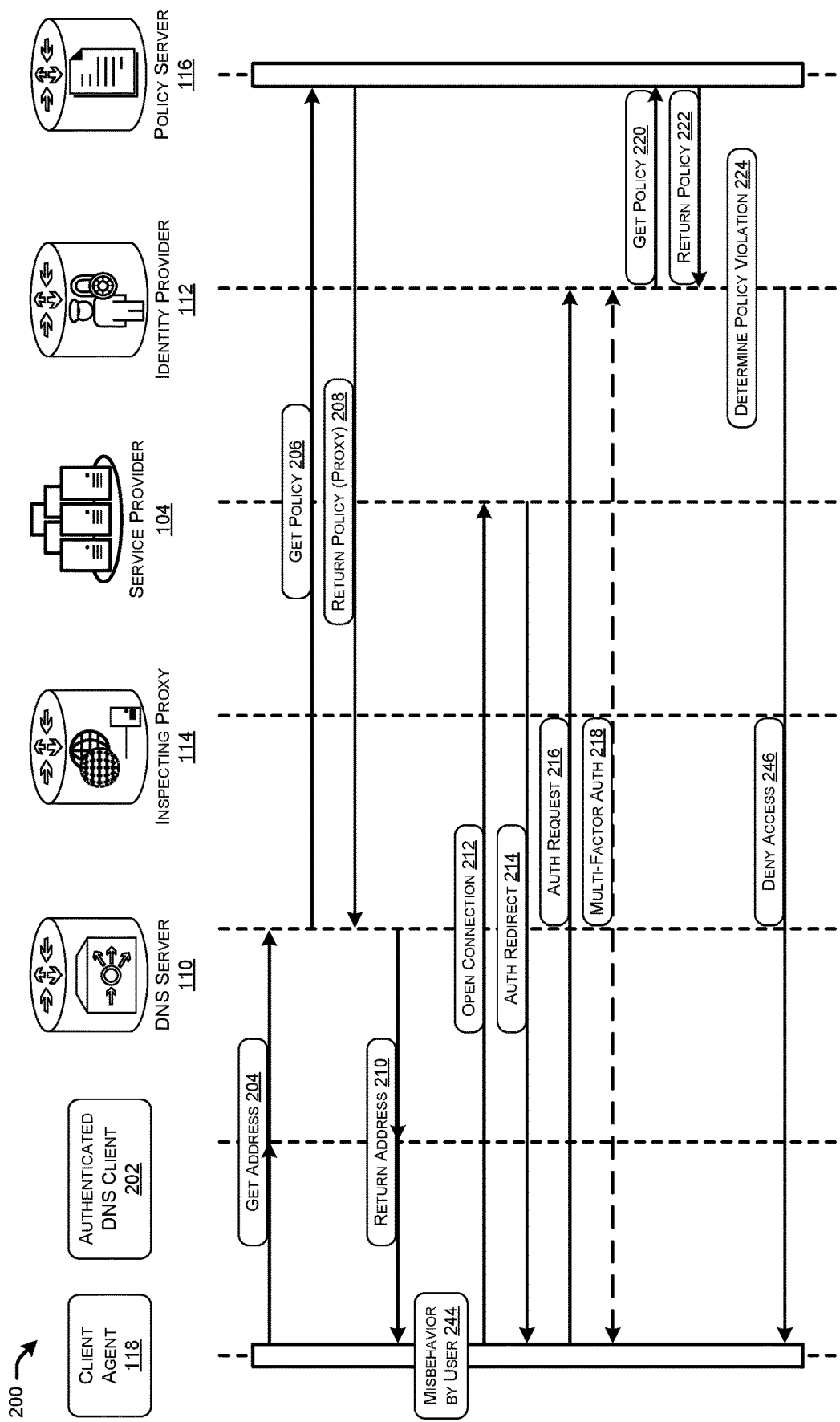
FIG. 2C illustrates a data flow diagram of an example process according to which an enterprise traffic interception service may enforce a policy denying a client device access to a service provider using a connection that conflicts with the policy.

FIGS. 2A-2C illustrate various data flow diagrams associated with an example process 200 according to which an enterprise traffic interception service 102 may enforce a policy mandating how a client device 106 may access a service provider 104 in various ways. In some examples, FIGS. 2A-2C may include an authenticated DNS client 202 associated with a client device 106. The authenticated DNS client 202 may include various components and/or technologies as that of the authenticated DNS client previously described with respect to FIGS. 1A and 1B.

Additionally, it should be noted that the example traffic flow described herein may be performed without the authenticated DNS client 202 on the enterprise client device 106. As previously described, the authenticated DNS client agent 202 may be configured to establish an authenticated channel with the enterprise TIS 102 controlled DNS server 110, providing the enterprise DNS server 110 with an authenticated identity of the client. However, the DNS server 110 may determine an identity of the client in other ways. In some examples, a personalized DNS server may be implemented. For example, a different DNS server may be utilized for each client, or groups of clients under the same policy. Each DNS server may respond to the query according to the client (or group of clients) policy that it is associated with. Thus, relieving the system and/or process of the requirement to have an authenticated DNS client agent 202, and instead the system and/or process may only require a client to configure their own device to use a specific (personalized) DNS server.

FIG. 2A illustrates a data flow diagram of an example process 200 according to which an enterprise traffic interception service 102 may enforce a policy allowing a client device 106 access to a service provider 104 using a direct connection.

At 204, the DNS server may receive, from a client agent 118 (e.g., a browser) executing on the enterprise client device 106, a request to resolve the service provider name (e.g., app.enterprise.com). The enterprise DNS server 110 may determine an identity of the client. For example, the client device may have an authenticated DNS client agent 202 installed thereon. The authenticated DNS client agent 202 may be configured to establish an authenticated channel with the enterprise TIS 102 controlled DNS server 110, providing the enterprise DNS server 110 with an authenticated identity of the client. Additionally, or alternatively, the enterprise DNS server 110 may be configured such that all requests to resolve a service provider name must include a client ID that may be used to identify the client.

At 206, once the enterprise DNS server 110 has identified the client, the DNS server 110 may query the policy server 116 based on the client name and the service name.

At 208, the policy server 116 may return the corresponding policy to the DNS server 110. The DNS server 110 may determine, based on the associated policy, that the client needs to access the service direct.

At 210, the DNS server 110 may reply to the client agent 118 with the IP address of the actual service provider 104 (e.g., 5.6.7.8).

At 212, the client agent 118 may then utilize the IP address to directly contact the service provider 104 and request for a specific URL or path (e.g., app.enterprise.com/path).

At 214, the service provider 104 may receive the request for the specific URL and then redirect the client agent to the enterprise IdP service 112 along with a service provider SAML request, generated by the service provider 104, for authentication.

At 216, as previously mentioned, the service provider 104 may redirect the client agent 118 to the enterprise IdP service 112 along with the service provider SAML request for authentication.

At 218, the enterprise IdP service 112 may then work to authenticate the client. In some examples, the enterprise IdP service 112 may challenge the client using any authentication technique, such as, for example single-factor authentication, multi-factor authentication, biometric authentication, etc.

At 220, Once enterprise IdP service 112 has authenticated and/or identified the client, the enterprise IdP service 112 may query the policy server 116 based on the client name and the service name.

At 222, the policy server 116 may return the corresponding policy to the enterprise IdP service 112. The enterprise IdP service 112 may then determine, based on the associated policy, that the client device 106 needs to access the service direct.

At 224, the enterprise IdP service 112 may then perform a policy verification to verify that the client is being compliant with the policy, such as, for example, verifying that the SAML request received from the client agent 118 comports with the policy. The enterprise IdP service 112 may verify that the SAML request previously received has been issued by the service provider 104, which may indicate that the user agent 118 is attempting to connect directly to the service provider 104. The enterprise IdP service 112 may determine that this is in line with the policy disposition received from the policy server 116, and the enterprise IdP service 112 may authorize the flow and generate a SAML assertion to send to the client device 106. In some examples the SAML assertion may be configured as a service provider 104 SAML assertion to assert authorization for the service provider 104.

At 226, the enterprise IdP service 112 may redirect the client agent 118 to the service name (e.g., app.enterprise.com with IP address 5.6.7.8) along with the service provider SAML assertion.

At 228, the client agent 118 may send the service provider SAML assertion to the service provider 104 to authorize the client and open the connection.

At 230, the service provider 104 may use the service provider SAML assertion to authorize the client and may serve the request content to the client device 106. Additionally, or alternatively, the service provider 104 may install a cookie to maintain the authorization for a subsequent period of time. The service provider 104 may then send the cookie to the client device 106, where the cookie may be utilized to authorize the client device 106 with the service provider 104 for the subsequent period of time.

FIG. 2B illustrates a data flow diagram of an example process 200 according to which an enterprise traffic interception service 102 may enforce a policy allowing a client device 106 access to a service provider 104 using a proxied connection.

At 204, the DNS server may receive, from a client agent 118 (e.g., a browser) executing on the enterprise client device 106, a request to resolve the service provider name (e.g., app.enterprise.com). The enterprise DNS server 110 may determine an identity of the client. For example, the client device may have an authenticated DNS client agent 202 installed thereon. The authenticated DNS client agent 202 may be configured to establish an authenticated channel with the enterprise TIS 102 controlled DNS server 110, providing the enterprise DNS server 110 with an authenticated identity of the client. Additionally, or alternatively, the enterprise DNS server 110 may be configured such that all requests to resolve a service provider name must include a client ID that may be used to identify the client.

At 206, once the enterprise DNS server 110 has identified the client, the DNS server 110 may query the policy server 116 based on the client name and the service name.

At 208, the policy server 116 may return the corresponding policy to the DNS server 110. The DNS server 110 may determine, based on the associated policy, that the client needs to go through the inspecting proxy 114 to access the service provider 104.

At 210, the DNS server 110 may reply to the client agent 118 with the IP address of the inspecting proxy 114 (e.g., 1.2.3.4).

At 212, the client agent 118 may then utilize the IP address to contact the inspecting proxy 114 and request for a specific URL or path associated with the service provider (e.g., app.enterprise.com/path).

At 214, the inspecting proxy 114 may receive the request for the specific URL and then redirect the client agent 118 to the enterprise IdP service 112 along with a proxy SAML request, generated by the inspecting proxy 114, for authentication.

At 216, as previously mentioned, the inspecting proxy 114 may redirect the client agent 118 to the enterprise IdP service 112 along with the proxy SAML request for authentication.

At 218, the enterprise IdP service 112 may then work to authenticate the client. In some examples, the enterprise IdP service 112 may challenge the client using any authentication technique, such as, for example single-factor authentication, multi-factor authentication, biometric authentication, etc.

At 220, Once enterprise IdP service 112 has authenticated and/or identified the client, the enterprise IdP service 112 may query the policy server 116 based on the client name and the service name.

At 222, the policy server 116 may return the corresponding policy to the enterprise IdP service 112. The enterprise IdP service 112 may then determine, based on the associated policy, that the client device 106 needs to go through the inspecting proxy to access the service provider.

At 224, the enterprise IdP service 112 may then perform a policy verification to verify that the client is being compliant with the policy, such as, for example, verifying that the SAML request received from the client agent 118 comports with the policy. The enterprise IdP service 112 may verify that the SAML request previously received has been issued by the inspecting proxy 114, which may indicate that the client agent 118 is attempting to go through the inspecting proxy 114 to connect to the service provider 104. The enterprise IdP service 102 may determine that this is in line with the policy disposition received from the policy server 116, and the enterprise IdP service 102 may authorize the flow and generate two SAML assertions, such as, for example, a proxy SAML assertion in response to the proxy SAML request, and a service provider SAML assertion to assert authorization for the service provider 104. In some examples, the proxy SAML assertion is sent to the client device 106 and the service provider SAML assertion is stored in a data store associated with the enterprise IdP service 112.

At 232, the enterprise IdP service 112 may redirect the client agent 118 to the service name (e.g., app.enterprise.com with IP address 1.2.3.4) along with the proxy SAML assertion.

At 228, the client agent 118 may send the proxy SAML assertion to the inspecting proxy authorize the client and open the connection.

At 234, as previously mentioned, the client agent 118 may be redirected to the inspecting proxy 114, and the inspecting proxy 114 may then query the enterprise IdP service 112, providing the enterprise IdP service 112 with the proxy SAML assertion, to receive the service provider SAML assertion stored in the data store associated with the enterprise IdP service 112.

At 236, the enterprise IdP service 112 may return the service provider SAML assertion to the inspecting proxy 114 for use to authenticate the inspecting proxy 114 with the service provider 104.

At 238, the inspecting proxy 114 may then send the request to the service provider 104 and provide the service provider 104 with the service provider SAML statement retrieved from the enterprise IdP service 112 to authenticate the inspecting proxy 114 with the service provider 104 and open the connection.

At 230, the service provider 104 may then use the service provider SAML assertion to authorize the client and serve the requested content to the inspecting proxy 114. Additionally, or alternatively, the service provider 104 may install a first cookie to maintain the authorization for a subsequent period of time. The service provider 104 may then send the first cookie to the inspecting proxy 114, where the cookie may be utilized to authorize the client via the inspecting proxy 114 with the service provider 104 for the subsequent period of time.

At 240, the inspecting proxy 114 may store the first cookie in a local data store associated with the inspecting proxy 114. The inspecting proxy 114 may then install a second cookie to maintain the authorization to the proxy 114 for a subsequent period of time. This prevents the client device 106 from using the first cookie to access the service provider 104 directly, which is not in line with the policy.

At 242, the inspecting proxy 114 may then forward the content served from the service provider 104, to the client device 106. Additionally, or alternatively, the inspecting proxy 114 may then send the second cookie to the client device 106, where the second cookie may be utilized to authorize the client device 106 with the inspecting proxy 114 for the subsequent period of time.

FIG. 2C illustrates a data flow diagram of an example process 200 according to which an enterprise traffic interception service 102 may enforce a policy denying a client device 106 access to a service provider 104 using a connection that conflicts with the policy.

At 204, the DNS server may receive, from a client agent 118 (e.g., a browser) executing on the enterprise client device 106, a request to resolve the service provider name (e.g., app.enterprise.com). The enterprise DNS server 110 may determine an identity of the client. For example, the client device may have an authenticated DNS client agent 202 installed thereon. The authenticated DNS client agent 202 may be configured to establish an authenticated channel with the enterprise TIS 102 controlled DNS server 110, providing the enterprise DNS server 110 with an authenticated identity of the client. Additionally, or alternatively, the enterprise DNS server 110 may be configured such that all requests to resolve a service provider name must include a client ID that may be used to identify the client.

At 206, once the enterprise DNS server 110 has identified the client, the DNS server 110 may query the policy server 116 based on the client name and the service name.

At 208, the policy server 116 may return the corresponding policy to the DNS server 110. The DNS server 110 may determine, based on the associated policy, that the client needs to go through the inspecting proxy 114 to access the service provider 104.

At 210, the DNS server 110 may reply to the client agent 118 with the IP address of the inspecting proxy 114 (e.g., 1.2.3.4).

At 244, a misbehavior may be performed by the client and/or client device 106. For example, while the DNS server 110 has replied with the IP address of the inspecting proxy 114 (e.g., 1.2.3.4), the client may ignore the DNS reply. The client may instead contact the service provider 104 directly using the IP address of the service provider 104 (e.g., 5.6.7.8) and request for a specific URL or path associated with the service provider (e.g., app. enterprise. com/path).

At 212, the client agent 118 may misbehave and utilize the IP address of the service provider 104 to directly contact the service provider 104 and request for a specific URL or path (e.g., app.enterprise.com/path).

At 214, the service provider 104 may receive the request for the specific URL and then redirect the client agent to the enterprise IdP service 112 along with a service provider SAML request, generated by the service provider 104, for authentication.

At 216, as previously mentioned, the service provider 104 may redirect the client agent 118 to the enterprise IdP service 112 along with the service provider SAML request for authentication.

At 218, the enterprise IdP service 112 may then work to authenticate the client. In some examples, the enterprise IdP service 112 may challenge the client using any authentication technique, such as, for example single-factor authentication, multi-factor authentication, biometric authentication, etc.

At 220, Once enterprise IdP service 112 has authenticated and/or identified the client, the enterprise IdP service 112 may query the policy server 116 based on the client name and the service name.

At 222, the policy server 116 may return the corresponding policy to the enterprise IdP service 112. The enterprise IdP service 112 may then determine, based on the associated policy, that the client device 106 needs to access the service direct.

At 224, the enterprise IdP service 112 may then perform a policy verification to verify that the client is being compliant with the policy, such as, for example, verifying that the SAML request received from the client agent 118 comports with the policy. For example, the enterprise IdP service 112 may determine that the SAML request previously received has been issued by the service provider 104, which may indicate that the user agent 118 is attempting to connect directly to the service provider 104. The enterprise IdP service 112 may determine that this is not in line with the policy disposition received from the policy server 116, and the enterprise IdP service 112 may deny the flow and/or notify the client of access denial due to violation of the policy.

At 246, as previously mentioned, the enterprise IdP service 112 may deny the flow and/or notify the client of access denial due to a violation of the policy. In some examples, the enterprise IdP service 112 may cause the client agent 118 to present a customized webpage including an indication of such a denial. In some examples, the customized webpage may include instructions for the client to follow to utilize the inspecting proxy 114 to access the service provider. Additionally, or alternatively, the customized webpage may include an instruction for the client to reconfigure the DNS server from a personalized DNS server to the enterprise DNS server 110.

Figure 3:
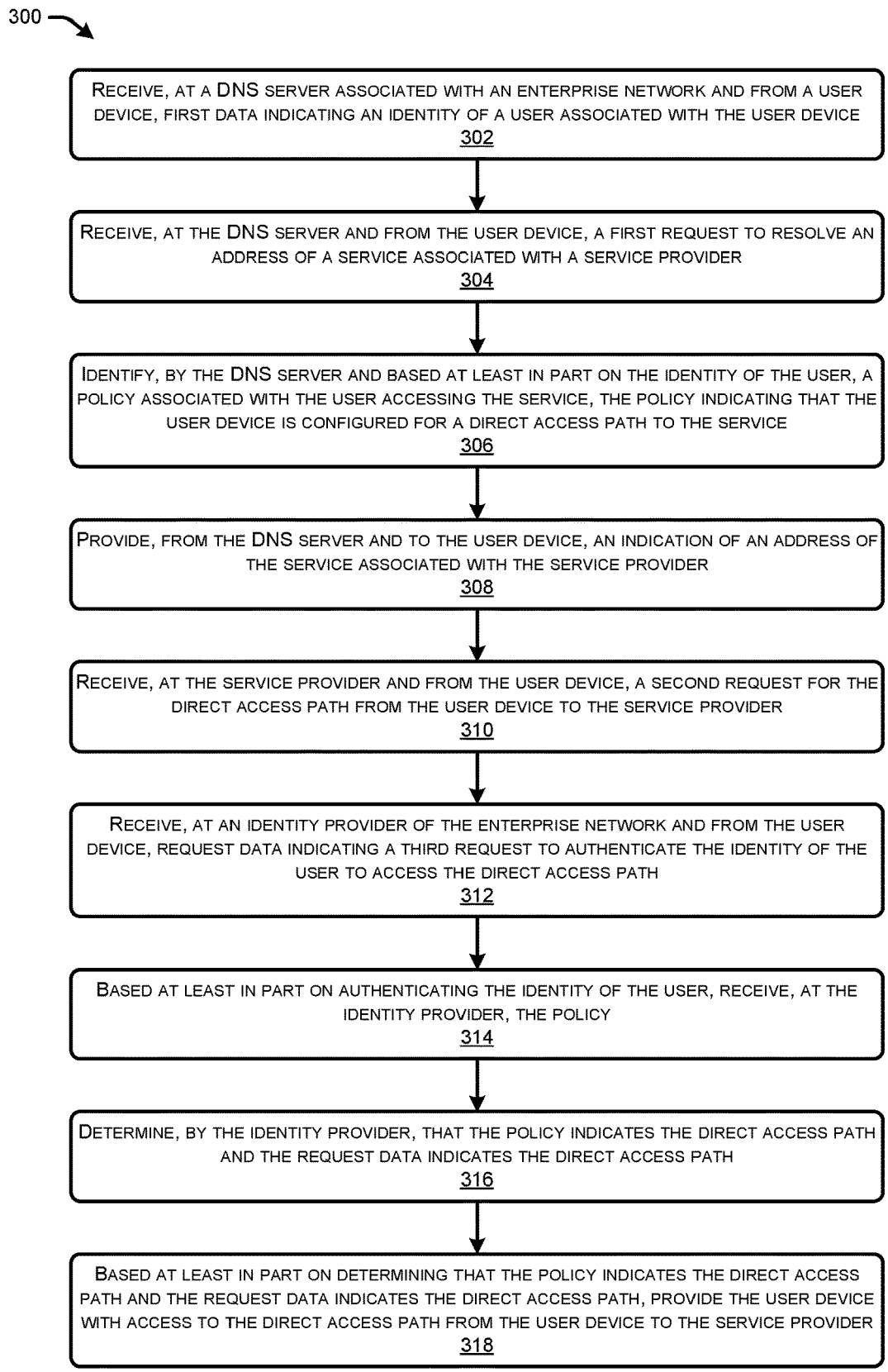
FIG. 3 illustrates a flow diagram of an example method for using an enterprise traffic interception service to enforce a policy that allows a client device access to a service provider using a direct connection.
Figure 4:
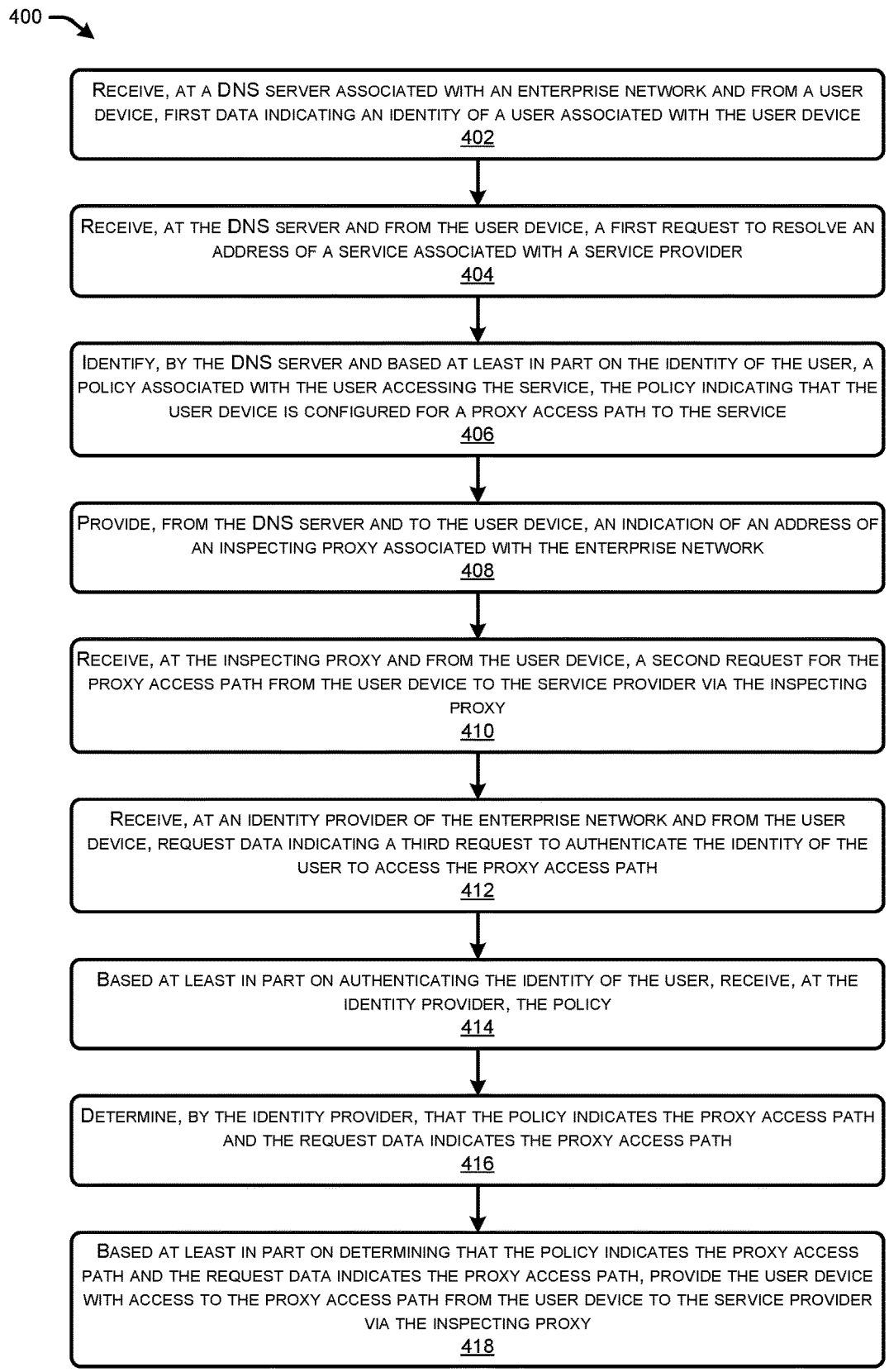
FIG. 4 illustrates a flow diagram of an example method for using an enterprise traffic interception service to enforce a policy that allows a client device access to a service provider using a proxied connection.
Figure 5:
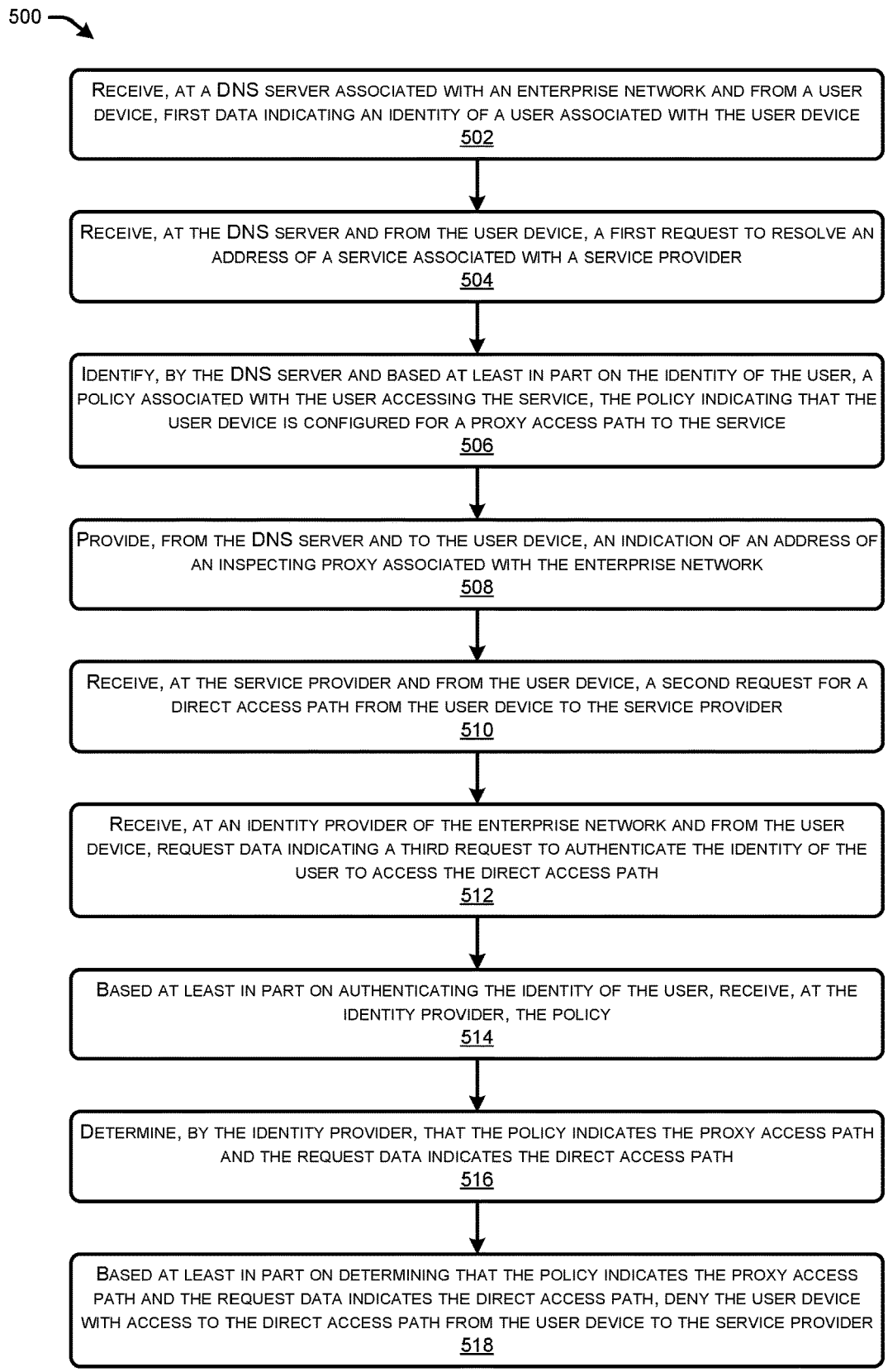
FIG. 5 illustrates a flow diagram of an example method for using an enterprise traffic interception service to enforce a policy that denies a client device access to a service provider using a connection that conflicts with the policy.

FIGS. 3-5 illustrate flow diagrams of example methods 300, 400, and 500 that illustrate aspects of the functions performed at least partly by the enterprise traffic interception service 102 as described in FIGS. 1A-2. The logical operations described herein with respect to FIGS. 3, 4, and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 3, 4, 5, and as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for using an enterprise traffic interception service 102 to enforce a policy that allows a client device 106 access to a service provider 104 using a direct connection.

At 302, the method 300 may include receiving, at a domain name service (DNS) server 110 associated with an enterprise network and from a user device 106, first data indicating an identity of a user associated with the user device 106. In some examples, the enterprise network may be configured as the enterprise traffic interception service 102.

At 304, the method 300 may include receiving, at the DNS server 110 and from the user device 106, a first request to resolve an address of a service associated with a service provider 104.

At 306, the method 300 may include identifying, by the DNS server 110 and based at least in part on the identity of the user, a policy associated with the user accessing the service, the policy indicating that the user device 106 is configured for a direct access path to the service.

At 308, the method 300 may include providing, from the DNS server 110 and to the user device 106, an indication of an address of the service associated with the service provider 104.

At 310, the method 300 may include receiving, at the service provider 104 and from the user device 106, a second request for the direct access path from the user device 106 to the service provider 104.

At 312, the method 300 may include receiving, at an identity provider 112 of the enterprise network and from the user device 106, request data indicating a third request to authenticate the identity of the user to access the direct access path.

At 314, the method 300 may include based at least in part on authenticating the identity of the user, receiving, at the identity provider 112, the policy.

At 316, the method 300 may include determining, by the identity provider 112, that the policy indicates the direct access path and the request data indicates the direct access path.

At 318, the method 300 may include based at least in part on determining that the policy indicates the direct access path and the request data indicates the direct access path, providing the user device with access to the direct access path from the user device 106 to the service provider 104.

Additionally, or alternatively, the method 300 may include generating, by the identity provider, an authorization assertion indicating that the user device may access the direct access path. Additionally, or alternatively, the method 300 may include sending the authorization assertion from the identity provider to the user device. Additionally, or alternatively, the method 300 may include based at least in part on receiving the authorization assertion at the user device, sending the authorization assertion from the user device to the service provider. Additionally, or alternatively, providing the user device with access to the direct access pass from the user device to the service provider may be based at least in part on sending the authorization assertion from the user device to the service provider.

Additionally, or alternatively, the method 300 may include generating, by the service provider, a cookie associated with the user device, the cookie indicating authorization to access the service. In some examples, generating the cookie may be based at least in part on providing the user device with access to the direct access path. Additionally, or alternatively, the method 300 may include storing, in a datastore associated with the service provider, the cookie. Additionally, or alternatively, the method 300 may include sending the cookie from the service provider to the user device.

Additionally, or alternatively, the second request may be received at a first time. Additionally, or alternatively, the method 300 may include receiving, at the service provider and from the user device at a second time subsequent to the first time, a fourth request for the direct access path from the user device to the service provider, the fourth request including the cookie. Additionally, or alternatively, the method 300 may include identifying, in the datastore associated with the service provider, the cookie. Additionally, or alternatively, the method 300 may include providing the user device with access to the direct access path. In some examples, providing the user device with access to the direct access path may be based at least in part on the service provider identifying the cookie.

Additionally, or alternatively, the user device may include an authenticated DNS client associated with the identity of the user. Additionally, or alternatively, the method 300 may include establishing, by the authenticated DNS client, an authenticated channel connecting the authenticated DNS client with the DNS server, the authenticated channel indicating the identity of the user associated with the user device. Additionally, or alternatively, identifying the policy associated with the user accessing the service may be based at least in part on the authenticated channel.

Additionally, or alternatively, the direct access path may be configured to send content associated with the service from the service provider to the user device. Additionally, or alternatively, the proxy access path may be configured to send the content from the service provider to the inspecting proxy. Additionally, or alternatively, the proxy access path may be configured to inspect, by the inspecting proxy, the content. Additionally, or alternatively, the proxy access path may be configured to send the content from the inspecting proxy to the user device.

FIG. 4 illustrates a flow diagram of an example method 400 for using an enterprise traffic interception service 102 to enforce a policy that allows a client device 106 access to a service provider 104 using a proxied connection.

At 402, the method 400 may include receiving, at a domain name service (DNS) server 110 associated with an enterprise network 102 and from a user device 106, first data indicating an identity of a user associated with the user device 106. In some examples, the enterprise network may be configured as the enterprise traffic interception service 102.

At 404, the method 400 may include receiving, at the DNS server 110 and from the user device 106, a first request to resolve an address of a service associated with a service provider 104.

At 406, the method 400 may include identifying, by the DNS server 110 and based at least in part on the identity of the user, a policy associated with the user accessing the service, the policy indicating that the user device 106 is configured for a proxy access path to the service.

At 408, the method 400 may include providing, from the DNS server 110 and to the user device 106, an indication of an address of an inspecting proxy 114 associated with the enterprise network 102.

At 410, the method 400 may include receiving, at the inspecting proxy 114 and from the user device 106, a second request for the proxy access path from the user device 106 to the service provider 104 via the inspecting proxy 114.

At 412, the method 400 may include receiving, at an identity provider 112 of the enterprise network 102 and from the user device 106, request data indicating a third request to authenticate the identity of the user to access the proxy access path.

At 414, the method 400 may include based at least in part on authenticating the identity of the user, receiving, at the identity provider 112, the policy.

At 416, the method 400 may include determining, by the identity provider 112, that the policy indicates the proxy access path and the request data indicates the proxy access path.

At 418, the method 400 may include based at least in part on determining that the policy indicates the proxy access path and the request data indicates the proxy access path, providing the user device 106 with access to the proxy access path from the user device 106 to the service provider 104 via the inspecting proxy 114.

Additionally, or alternatively, the method 400 may include generating, by the identity provider, a first authorization assertion indicating that the user device may access the proxy access path. Additionally, or alternatively, the method 400 may include sending the first authorization assertion from the identity provider to the user device. Additionally, or alternatively, the method 400 may include based at least in part on receiving the first authorization assertion at the user device, sending the first authorization assertion from the user device to the inspecting proxy. In some examples, providing the user device with access to the proxy access pass from the user device to the service provider via the inspecting proxy may be based at least in part on sending the first authorization assertion from the user device to the inspecting proxy.

Additionally, or alternatively, the method 400 may include sending, from the inspecting proxy and to the identity provider, a query for a second authorization assertion, the query including the first authorization assertion. Additionally, or alternatively, the method 400 may include generating, by the identity provider, a second authorization assertion indicating that the inspecting proxy may access the service. Additionally, or alternatively, the method 400 may include sending the second authorization assertion from the identity provider to the inspecting proxy. Additionally, or alternatively, the method 400 may include based at least in part on receiving the second authorization assertion at the inspecting proxy, sending the second authorization assertion from the inspecting proxy to the service provider. In some examples, providing the user device with access to the proxy access pass from the user device to the service provider via the inspecting proxy may be based at least in part on sending the second authorization assertion from the inspecting proxy to the service provider.

In some examples, the second request may be received at a first time. Additionally, or alternatively, the method 400 may include receiving, at the inspecting proxy and from the user device at a second time subsequent to the first time, a fourth request for the proxy access path from the user device to the service provider, the fourth request including the second cookie. Additionally, or alternatively, the method 400 may include identifying, in the data store associated with the inspecting proxy, the second cookie. Additionally, or alternatively, the method 400 may include receiving, at the service provider and from the inspecting proxy, the fourth request and the first cookie. Additionally, or alternatively, the method 400 may include identifying, in the data store associated with the service provider, the first cookie. Additionally, or alternatively, the method 400 may include based at least in part on the inspecting proxy identifying the second cookie and the service provider identifying the first cookie, providing the user device with access to the proxy access path.

Additionally, or alternatively, the method 400 may include based at least in part on providing the user device with access to the proxy access path, generating, by the service provider, a first cookie associated with the user device, the first cookie indicating authorization to access the service. Additionally, or alternatively, the method 400 may include storing, in a first datastore associated with the service provider, the first cookie. Additionally, or alternatively, the method 400 may include sending the first cookie from the service provider to the inspecting proxy. Additionally, or alternatively, the method 400 may include generating, by the inspecting proxy, a second cookie associated with the user device, the second cookie indicating authorization to access the service via the proxy access path. Additionally, or alternatively, the method 400 may include storing, in a second data store associated with the inspecting proxy, the first cookie and the second cookie. Additionally, or alternatively, the method 400 may include sending the second cookie from the inspecting proxy to the user device.

In some examples, the user device may include an authenticated DNS client associated with the identity of the user. Additionally, or alternatively, the method 400 may include establishing, by the authenticated DNS client, an authenticated channel connecting the authenticated DNS client with the DNS server, the authenticated channel indicating the identity of the user associated with the user device. In some examples, identifying the policy associated with the user accessing the service may be based at least in part on the authenticated channel.

FIG. 5 illustrates a flow diagram of an example method 400 for using an enterprise traffic interception service 102 to enforce a policy that denies a client device 106 access to a service provider 104 using a connection that conflicts with the policy.

At 502, the method 500 may include receiving, at a domain name service (DNS) server 110 associated with an enterprise network 102 and from a user device 106, first data indicating an identity of a user associated with the user device 106. In some examples, the enterprise network may be configured as the enterprise traffic interception service 102.

At 504, the method 500 may include receiving, at the DNS server 110 and from the user device 106, a first request to resolve an address of a service associated with a service provider 104.

At 506, the method 500 may include identifying, by the DNS server 110 and based at least in part on the identity of the user, a policy associated with the user accessing the service, the policy indicating that the user device 106 is configured for a proxy access path to the service.

At 508, the method 500 may include providing, from the DNS server 110 and to the user device 106, an indication of an address of an inspecting proxy 114 associated with the enterprise network 102.

At 510, the method 500 may include receiving, at the service provider 104 and from the user device 106, a second request for a direct access path from the user device 106 to the service provider 104.

At 512, the method 500 may include receiving, at an identity provider 112 of the enterprise network 102 and from the user device 106, request data indicating a third request to authenticate the identity of the user to access the direct access path.

At 514, the method 500 may include based at least in part on authenticating the identity of the user, receiving, at the identity provider 112, the policy.

At 516, the method 500 may include determining, by the identity provider 112, that the policy indicates the proxy access path and the request data indicates the direct access path.

At 518, the method 500 may include based at least in part on determining that the policy indicates the proxy access path and the request data indicates the direct access path, denying the user device 106 access to the direct access path from the user device 106 to the service provider 104.

Additionally, or alternatively, the method 500 may include sending, from the identity provider and to the user device, second data configured to redirect the user device to a customized webpage.

In some examples, the customized webpage includes an instruction for the user to install a required DNS client. Additionally, or alternatively, the DNS server may be configured as a personalized DNS server is configured as a personalized DNS server. In some examples, the customized webpage includes an instruction for the user to reconfigure the DNS server from the personalized DNS server to an enterprise DNS server. Additionally, or alternatively, the policy may indicate the direct access path and/or the request data may indicate the proxy access path. In some examples, the customized webpage includes an indication that the user may access the direct access path.

Additionally, or alternatively, the method 500 may include determining, by the identity provider, that the policy indicates the direct access path and the request data indicates the proxy access path. Additionally, or alternatively, the method 500 may include based at least in part on determining that the policy indicates the direct access path and the request data indicates the proxy access path, providing the user device access to the proxy access path from the user device to the service provider.

In some examples, the direct access path may be configured to send content associated with the service from the service provider to the user device. Additionally, or alternatively, the proxy access path may be configured to send the content from the service provider to the inspecting proxy. Additionally, or alternatively, the proxy access path may be configured to inspect, by the inspecting proxy, the content. Additionally, or alternatively, the proxy access path may be configured to send the content from the inspecting proxy to the user device.

Figure 6:
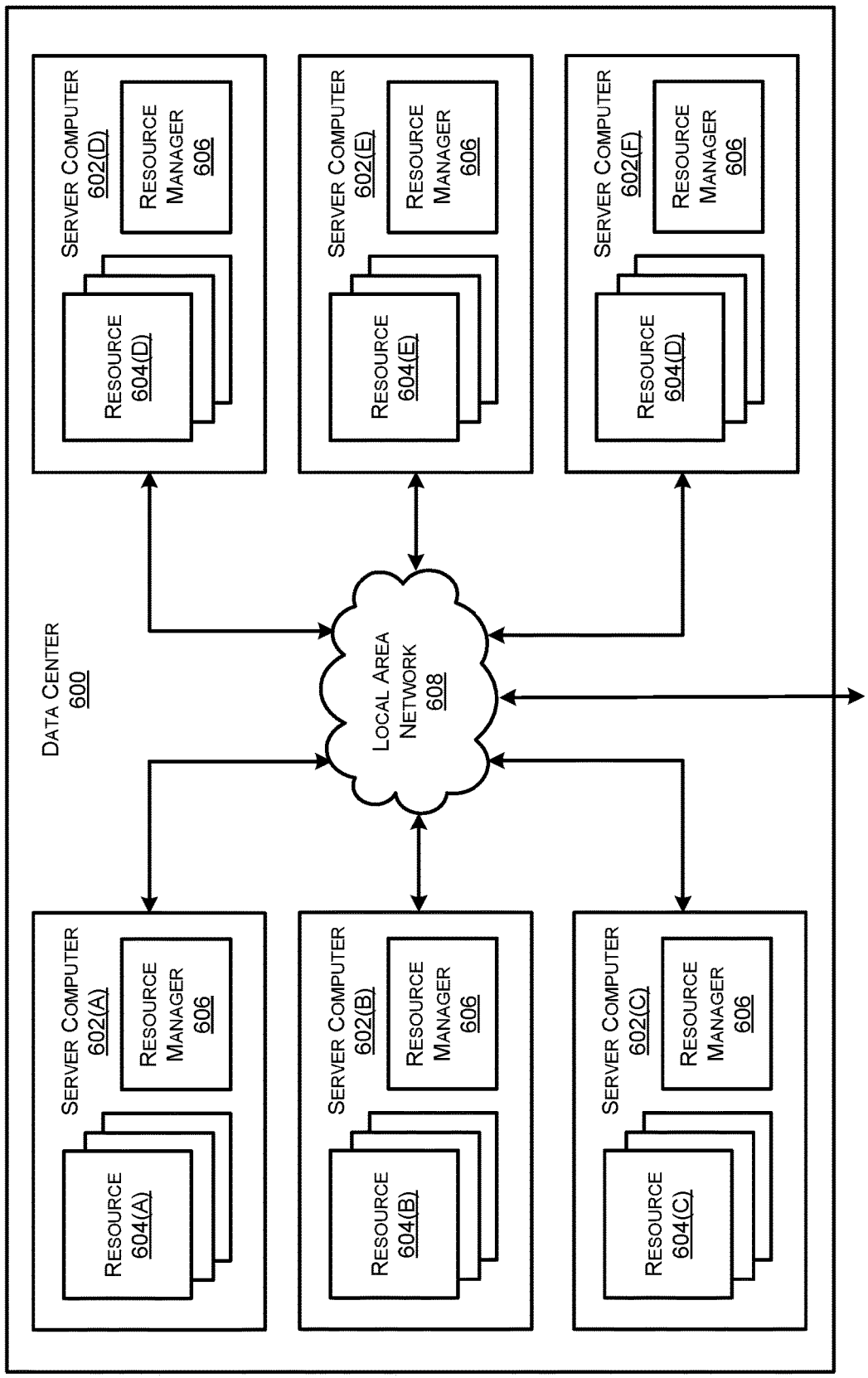
FIG. 6 illustrates a computing system diagram of an example configuration for a data center that can be utilized to implement aspects of the technologies disclosed herein.

FIG. 6 illustrates a computing system diagram of an example configuration for a data center 600 that can be utilized to implement aspects of the technologies disclosed herein. The example data center 600 shown in FIG. 6 includes several server computers 602A-602F (which might be referred to herein singularly as "a server computer 602" or in the plural as "the server computers 602") for providing computing resources. In some examples, the resources and/or server computers 602 may include, correspond to, the any type of computing device described herein. Although described as servers, the server computers 602 may comprise any type of networked device, such as servers, switches, routers, hubs, bridges, gateways, modems, repeaters, access points, etc.

The server computers 602 can be standard tower, rackmount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, VPNs, and others. Some of the servers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single server computer 602. Server computers 602 in the data center 600 can also be configured to provide network services and other types of services.

In the example data center 600 shown in FIG. 6, an appropriate LAN 608 is also utilized to interconnect the server computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the server computers 602A-602F in each data center 600, and, potentially, between computing resources in each of the server computers 602. It should be appreciated that the configuration of the data center 600 described with reference to FIG. 6 is merely illustrative and that other implementations can be utilized.

In some instances, the data center 600 may provide computing resources, like applications, VM instances, VPN instances, and storage, on a permanent or an as-needed basis. Among other types of functionality, the computing resources provided by a cloud computing network may be utilized to implement the various services and techniques described above. The computing resources 604 provided by the cloud computing network can include various types of computing resources, such as data processing resources like tenant containers and VM instances, data storage resources, networking resources, data communication resources, network services, VPN instances, and the like.

Each type of computing resource 604 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 604 not mentioned specifically herein.

The computing resources 604 provided by a cloud computing network may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 7.

Figure 7:
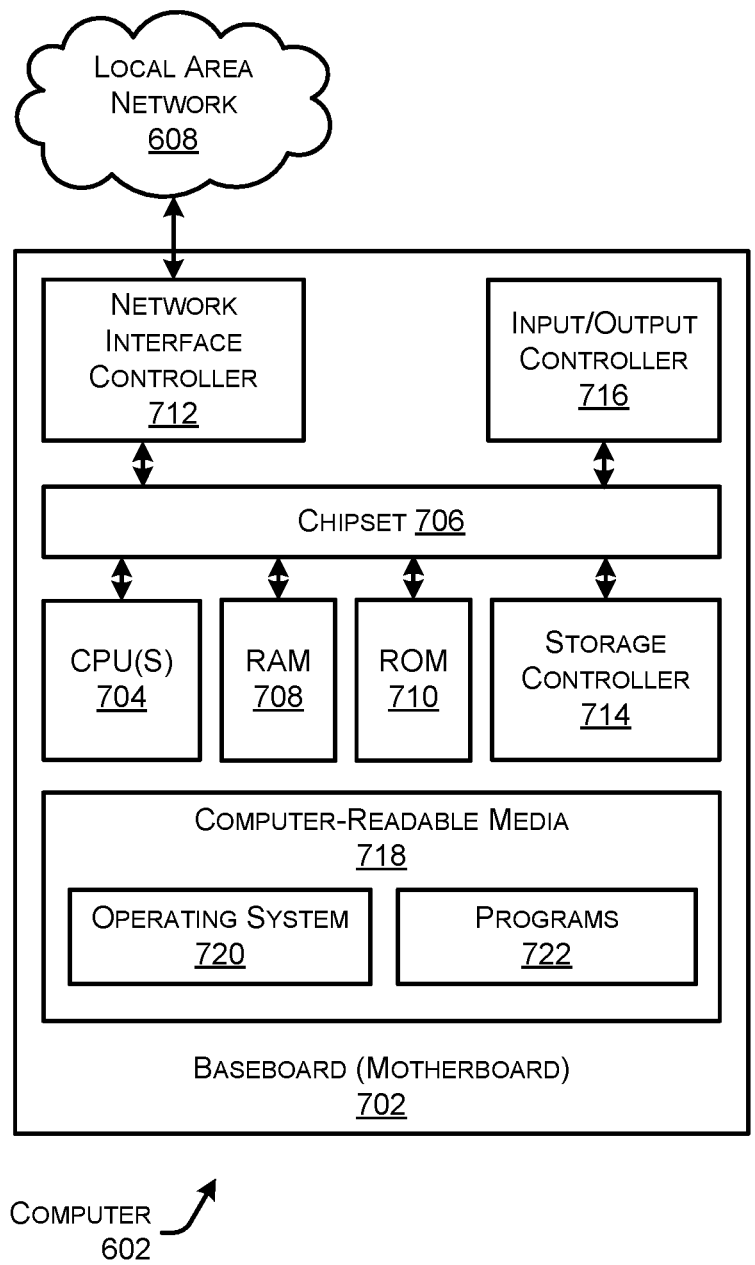
FIG. 7 illustrates a computer architecture diagram showing an example computer hardware architecture for implementing a network device that can be utilized to implement aspects of the various technologies presented herein.

FIG. 7 illustrates a computer architecture diagram showing an example computer hardware architecture for implementing a network device that can be utilized to implement aspects of the various technologies presented herein. The computer architecture shown in FIG. 7 illustrates a conventional server computer, workstation, desktop computer, laptop, tablet, network appliance, e-reader, smartphone, or other computing device, and can be utilized to execute any of the software components presented herein. The computer 700 may, in some examples, correspond to an SSO service 102 described herein, and may comprise networked devices such as servers, switches, routers, hubs, bridges, gateways, modems, repeaters, access points, etc.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the networks 116. The chipset 706 can include functionality for providing network connectivity through a NIC 712, such as a gigabit Ethernet adapter. The NIC 712 is capable of connecting the computer 700 to other computing devices over the networks 116. It should be appreciated that multiple NICs 712 can be present in the computer 700, connecting the computer to other types of networks and remote computer systems.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by the various components in the environment 100 may be supported by one or more devices similar to computer 700. Stated otherwise, some or all of the operations performed by the various components in the environment 100 may be performed by one or more computer devices 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 1A-5. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

As described herein, the computer 700 may comprise one or more of an enterprise traffic interception service 102, client device 106, or service provider 104. The computer 700 may include one or more hardware processors 704 (processors) configured to execute one or more stored instructions. The processor(s) 704 may comprise one or more cores. Further, the computer 700 may include one or more network interfaces configured to provide communications between the computer 700 and other devices, such as the communications described herein as being performed by the enterprise traffic interception service 102, the service provider, and/or the client device 106. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure. The programs 722 may enable the client device 106 to perform various operations.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receiving, at a Domain Name Service (DNS) server associated with an enterprise network and from a user device, first data indicating an identity of a user associated with the user device;

receiving, at the DNS server and from the user device, a first request to resolve an address of a service associated with a service provider;

identifying, by the DNS server and based at least in part on the identity of the user, a policy associated with the user accessing the service, the policy indicating that the user device is configured for a direct access path to the service;

providing, from the DNS server and to the user device, an indication of an address of the service associated with the service provider;

receiving, at the service provider and from the user device, a second request for the direct access path from the user device to the service provider;

receiving, at an identity provider of the enterprise network and from the user device, request data indicating a third request to authenticate the identity of the user to access the direct access path;

based at least in part on authenticating the identity of the user, receiving, at the identity provider, the policy;

determining, by the identity provider, that the policy indicates the direct access path and the request data indicates the direct access path; and based at least in part on determining that the policy indicates the direct access path and the request data indicates the direct access path, providing the user device with access to the direct access path from the user device to the service provider.

2. The method of claim 1, further comprising:

generating, by the identity provider, an authorization assertion indicating that the user device may access the direct access path;

sending the authorization assertion from the identity provider to the user device;

based at least in part on receiving the authorization assertion at the user device, sending the authorization assertion from the user device to the service provider; and wherein providing the user device with access to the direct access path from the user device to the service provider is based at least in part on sending the authorization assertion from the user device to the service provider.

3. The method of claim 1, further comprising:

based at least in part on providing the user device with access to the direct access path, generating, by the service provider, a cookie associated with the user device, the cookie indicating authorization to access the service;

storing, in a data store associated with the service provider, the cookie; and sending the cookie from the service provider to the user device.

4. The method of claim 3, wherein the second request is received at a first time, and the method further comprising:

receiving, at the service provider and from the user device at a second time subsequent to the first time, a fourth request for the direct access path from the user device to the service provider, the fourth request including the cookie;

identifying, in the data store associated with the service provider, the cookie; and based at least in part on the service provider identifying the cookie, providing the user device with access to the direct access path.

5. The method of claim 1, wherein the user device includes an authenticated DNS client associated with the identity of the user, and the method further comprising:
    establishing, by the authenticated DNS client, an authenticated channel connecting the authenticated DNS client with the DNS server, the authenticated channel indicating the identity of the user associated with the user device; and
    wherein identifying the policy associated with the user accessing the service is based at least in part on the authenticated channel.

6. The method of claim 1, wherein:
    the direct access path is configured to send content associated with the service from the service provider to the user device; and
    a proxy access path is configured to:
        send the content from the service provider to an inspecting proxy associated with the enterprise network;
        inspect, by the inspecting proxy, the content; and
        send the content from the inspecting proxy to the user device.

7. A method comprising:
    receiving, at a Domain Name Service (DNS) server associated with an enterprise network and from a user device, first data indicating an identity of a user associated with the user device;
    receiving, at the DNS server and from the user device, a first request to resolve an address of a service associated with a service provider;
    identifying, by the DNS server and based at least in part on the identity of the user, a policy associated with the user accessing the service, the policy indicating that the user device is configured for a proxy access path to the service;
    providing, from the DNS server and to the user device, an indication of an address of an inspecting proxy associated with the enterprise network;
    receiving, at the inspecting proxy and from the user device, a second request for the proxy access path from the user device to the service provider via the inspecting proxy;
    receiving, at an identity provider of the enterprise network and from the user device, request data indicating a third request to authenticate the identity of the user to access the proxy access path;
    based at least in part on authenticating the identity of the user, receiving, at the identity provider, the policy;
    determining, by the identity provider, that the policy indicates the proxy access path and the request data indicates the proxy access path; and
    based at least in part on determining that the policy indicates the proxy access path and the request data indicates the proxy access path, providing the user device with access to the proxy access path from the user device to the service provider via the inspecting proxy.

8. The method of claim 7, further comprising:
    generating, by the identity provider, a first authorization assertion indicating that the user device may access the proxy access path;
    sending the first authorization assertion from the identity provider to the user device;
    based at least in part on receiving the first authorization assertion at the user device, sending the first authorization assertion from the user device to the inspecting proxy; and
    wherein providing the user device with access to the proxy access path from the user device to the service provider via the inspecting proxy is based at least in part on sending the first authorization assertion from the user device to the inspecting proxy.

9. The method of claim 8, further comprising:
    sending, from the inspecting proxy and to the identity provider, a query for a second authorization assertion, the query including the first authorization assertion;
    generating, by the identity provider, a second authorization assertion indicating that the inspecting proxy may access the service;
    sending the second authorization assertion from the identity provider to the inspecting proxy;
    based at least in part on receiving the second authorization assertion at the inspecting proxy, sending the second authorization assertion from the inspecting proxy to the service provider; and
    wherein providing the user device with access to the proxy access path from the user device to the service provider via the inspecting proxy is based at least in part on sending the second authorization assertion from the inspecting proxy to the service provider.

10. The method of claim 7, further comprising:
    based at least in part on providing the user device with access to the proxy access path, generating, by the service provider, a first cookie associated with the user device, the first cookie indicating authorization to access the service;
    storing, in a first data store associated with the service provider, the first cookie; and
    sending the first cookie from the service provider to the inspecting proxy;
    generating, by the inspecting proxy, a second cookie associated with the user device, the second cookie indicating authorization to access the service via the proxy access path;
    storing, in a second data store associated with the inspecting proxy, the first cookie and the second cookie; and
    sending the second cookie from the inspecting proxy to the user device.

11. The method of claim 10, wherein the second request is received at a first time, and the method further comprising:
    receiving, at the inspecting proxy and from the user device at a second time subsequent to the first time, a fourth request for the proxy access path from the user device to the service provider, the fourth request including the second cookie;
    identifying, in the second data store associated with the inspecting proxy, the second cookie;
    receiving, at the service provider and from the inspecting proxy, the fourth request and the first cookie;
    identifying, in the first data store associated with the service provider, the first cookie; and
    based at least in part on the inspecting proxy identifying the second cookie and the service provider identifying the first cookie, providing the user device with access to the proxy access path.

12. The method of claim 7, wherein the user device includes an authenticated DNS client associated with the identity of the user, and the method further comprising:
    establishing, by the authenticated DNS client, an authenticated channel connecting the authenticated DNS client with the DNS server, the authenticated channel indicating the identity of the user associated with the user device; and wherein identifying the policy associated with the user accessing the service is based at least in part on the authenticated channel.

13. The method of claim 7, wherein:
a direct access path is configured to send content associated with the service from the service provider to the user device; and
the proxy access path is configured to:
    send the content from the service provider to the inspecting proxy;
    inspect, by the inspecting proxy, the content; and
    send the content from the inspecting proxy to the user device.

14. A method comprising:
receiving, at a Domain Name Service (DNS) server associated with an enterprise network and from a user device, first data indicating an identity of a user associated with the user device;
receiving, at the DNS server and from the user device, a first request to resolve an address of a service associated with a service provider;
identifying, by the DNS server and based at least in part on the identity of the user, a policy associated with the user accessing the service, the policy indicating that the user device is configured for a proxy access path to the service;
providing, from the DNS server and to the user device, an indication of an address of an inspecting proxy associated with the enterprise network;
receiving, at the service provider and from the user device, a second request for a direct access path from the user device to the service provider;
receiving, at an identity provider of the enterprise network and from the user device, request data indicating a third request to authenticate the identity of the user to access the direct access path;
based at least in part on authenticating the identity of the user, receiving, at the identity provider, the policy;
determining, by the identity provider, that the policy indicates the proxy access path and the request data indicates the direct access path; and
based at least in part on determining that the policy indicates the proxy access path and the request data indicates the direct access path, denying the user device access to the direct access path from the user device to the service provider.

15. The method of claim 14, further comprising sending, from the identity provider and to the user device, second data configured to redirect the user device to a customized webpage.

16. The method of claim 15, wherein the customized webpage includes an instruction for the user to install a required DNS client.

17. The method of claim 15, wherein:
the DNS server is configured as a personalized DNS server is configured as a personalized DNS server; and
the customized webpage includes an instruction for the user to reconfigure the DNS server from the personalized DNS server to an enterprise DNS server.

18. The method of claim 15, wherein
the policy indicates the direct access path;
the request data indicates the proxy access path; and
the customized webpage includes an indication that the user may access the direct access path.

19. The method of claim 18, further comprising:
determining, by the identity provider, that the policy indicates the direct access path and the request data indicates the proxy access path; and
based at least in part on determining that the policy indicates the direct access path and the request data indicates the proxy access path, providing the user device access to the proxy access path from the user device to the service provider.

20. The method of claim 14, wherein:
the direct access path is configured to send content associated with the service from the service provider to the user device; and
the proxy access path is configured to:
    send the content from the service provider to the inspecting proxy;
    inspect, by the inspecting proxy, the content; and
    send the content from the inspecting proxy to the user device.

* * * * *